United States Patent
Shi et al.

(10) Patent No.: US 12,457,653 B2
(45) Date of Patent: Oct. 28, 2025

(54) INFORMATION TRANSMISSION METHOD AND APPARATUS

(71) Applicant: HUAWEI TECHNOLOGIES CO., LTD., Guangdong (CN)

(72) Inventors: Xiaoli Shi, Shanghai (CN); Wenjie Peng, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 651 days.

(21) Appl. No.: 17/332,642

(22) Filed: May 27, 2021

(65) Prior Publication Data

US 2021/0289414 A1 Sep. 16, 2021

Related U.S. Application Data

(63) Continuation of application No. PCT/CN2019/121658, filed on Nov. 28, 2019.

(30) Foreign Application Priority Data

Nov. 29, 2018 (CN) .......................... 201811444968.8

(51) Int. Cl.
*H04W 76/15* (2018.01)
*H04B 7/06* (2006.01)
(Continued)

(52) U.S. Cl.
CPC ........ *H04W 76/15* (2018.02); *H04B 7/06964* (2023.05); *H04W 36/0055* (2013.01);
(Continued)

(58) Field of Classification Search
None
See application file for complete search history.

(56) References Cited

U.S. PATENT DOCUMENTS 9,622,136 B2 * 4/2017 Zhang ........... H04W 36/008375
9,686,730 B2 * 6/2017 Dai ................. H04W 36/00692
(Continued)

FOREIGN PATENT DOCUMENTS

| CN | 102256318 A | 11/2011 |
| CN | 102316509 A | 1/2012 |

(Continued)

OTHER PUBLICATIONS

Office Action issued in Chinese Application No. 201811444968.8 on Mar. 1, 2021, 21 pages (with English translation).
(Continued)

*Primary Examiner* — Andrew C Oh
(74) *Attorney, Agent, or Firm* — Fish & Richardson P.C.

(57) ABSTRACT

The present disclosure relates to information transmission methods. In one example method, a first network device or a second network device triggers a terminal device to be handed over from a first cell to a second cell. The terminal device sends second information, where the second information includes information about a radio link failure that occurs between the terminal device and the second cell, or information about beam failure recovery that occurs between the terminal device and the second cell. The first network device or the second network device performs mobility robustness optimization based on the second information.

23 Claims, 18 Drawing Sheets

(51) Int. Cl.
  *H04W 36/00* (2009.01)
  *H04W 36/30* (2009.01)
  *H04W 56/00* (2009.01)
(52) U.S. Cl.
  CPC ....... *H04W 36/305* (2018.08); *H04W 56/001* (2013.01); *H04W 36/00838* (2023.05)

(56) References Cited

U.S. PATENT DOCUMENTS

| | | | |
|---|---|---|---|
| 10,383,009 B2* | 8/2019 | Chiba | H04W 36/324 |
| 10,750,410 B2* | 8/2020 | Vrzic | H04W 36/185 |
| 10,798,619 B2* | 10/2020 | Nigam | H04W 36/00 |
| 11,032,744 B2* | 6/2021 | Majmundar | H04B 7/0602 |
| 11,337,265 B2* | 5/2022 | Zhou | H04B 7/088 |
| 2006/0209767 A1* | 9/2006 | Chae | H04W 52/343 370/335 |
| 2015/0005027 A1* | 1/2015 | Zeng | H04W 72/20 455/522 |
| 2015/0111580 A1* | 4/2015 | Wu | H04W 36/0038 455/436 |
| 2015/0230134 A1* | 8/2015 | Chiba | H04L 5/0098 370/331 |
| 2015/0327107 A1* | 11/2015 | Kim | H04W 72/20 370/252 |
| 2016/0073273 A1* | 3/2016 | Li | H04W 24/02 455/449 |
| 2016/0150458 A1* | 5/2016 | Wang | H04B 7/024 370/331 |
| 2016/0192245 A1* | 6/2016 | He | H04W 36/0055 370/331 |
| 2016/0205595 A1 | 7/2016 | Stewart et al. | |
| 2016/0212661 A1* | 7/2016 | Basu Mallick | H04W 36/0235 |
| 2016/0219604 A1* | 7/2016 | Fujishiro | H04W 76/15 |
| 2016/0277918 A1* | 9/2016 | Wang | H04W 76/11 |
| 2016/0309375 A1* | 10/2016 | Dai | H04W 36/0038 |
| 2017/0055187 A1* | 2/2017 | Kang | H04W 36/0058 |
| 2017/0188278 A1* | 6/2017 | Ohta | H04W 36/04 |
| 2017/0215117 A1* | 7/2017 | Kwon | H04B 7/0408 |
| 2017/0230232 A1* | 8/2017 | Liu | H04W 24/10 |
| 2017/0245181 A1* | 8/2017 | Zhang | H04W 36/08 |
| 2017/0318503 A1* | 11/2017 | Chiba | H04W 24/02 |
| 2017/0318504 A1* | 11/2017 | Zhang | H04W 36/0027 |
| 2017/0325143 A1* | 11/2017 | Dai | H04W 36/08 |
| 2018/0007591 A1* | 1/2018 | Xu | H04W 36/0069 |
| 2018/0035339 A1* | 2/2018 | Mitsui | H04W 72/04 |
| 2018/0049265 A1* | 2/2018 | Liu | H04W 88/085 |
| 2018/0115926 A1* | 4/2018 | Wu | H04W 36/0027 |
| 2018/0132303 A1 | 5/2018 | Xu et al. | |
| 2018/0206170 A1* | 7/2018 | Nagaraja | H04B 7/0696 |
| 2018/0249388 A1* | 8/2018 | Baek | H04W 36/00698 |
| 2018/0323842 A1* | 11/2018 | Majmundar | H04B 7/0602 |
| 2018/0367374 A1* | 12/2018 | Liu | H04L 5/0051 |
| 2019/0052337 A1* | 2/2019 | Kwon | H04W 74/0833 |
| 2019/0058629 A1* | 2/2019 | Akoum | H04L 1/16 |
| 2019/0081691 A1* | 3/2019 | Nagaraja | H04L 1/0026 |
| 2019/0150010 A1* | 5/2019 | Kwon | H04W 24/10 370/252 |
| 2019/0166539 A1* | 5/2019 | Chen | H04W 36/0088 |
| 2020/0274606 A1* | 8/2020 | Kang | H04L 5/0051 |
| 2020/0374890 A1* | 11/2020 | Wu | H04J 11/0023 |
| 2020/0404724 A1* | 12/2020 | Pedersen | H04B 7/0626 |
| 2021/0144768 A1* | 5/2021 | Isokangas | H04W 74/0833 |
| 2021/0289372 A1* | 9/2021 | Liu | H04B 7/06964 |
| 2022/0006690 A1* | 1/2022 | Matsumura | H04L 41/0672 |

FOREIGN PATENT DOCUMENTS

| | | | | |
|---|---|---|---|---|
| CN | 102395148 A | | 3/2012 | |
| CN | 104285469 A | | 1/2015 | |
| CN | 104737461 A | * | 6/2015 | ............... H04B 7/02 |
| CN | 107666672 A | | 2/2018 | |
| CN | 109076408 A | * | 12/2018 | ........... H04W 36/324 |
| CN | 110034844 A | * | 7/2019 | ............ H04L 1/0023 |
| CN | 110972143 A | * | 4/2020 | ............ H04W 72/542 |
| EP | 3836734 A1 | * | 6/2021 | ............. H04W 72/21 |
| KR | 20160150458 A | * | 12/2016 | ......... G01M 11/3172 |
| KR | 20170120035 A | * | 10/2017 | ............ H04W 36/08 |
| KR | 20180016249 A | * | 2/2018 | ......... H04W 36/0069 |
| KR | 20180028896 A | * | 3/2018 | ............ H04W 36/08 |
| KR | 102170402 B1 | * | 10/2020 | ............ H04W 36/02 |
| KR | 102294454 B1 | * | 8/2021 | ............ H04W 36/30 |
| WO | 2008151325 A1 | | 12/2008 | |
| WO | WO-2014163450 A1 | * | 10/2014 | ............ H04W 36/04 |
| WO | 2015020321 A1 | | 2/2015 | |
| WO | 2015175140 A1 | | 11/2015 | |
| WO | WO-2016070920 A1 | * | 5/2016 | .......... H04W 36/324 |
| WO | 2017073844 A1 | | 5/2017 | |
| WO | WO-2017183897 A1 | * | 10/2017 | ............ H04W 36/36 |
| WO | 2018028455 A1 | | 2/2018 | |
| WO | 2018030841 A1 | | 2/2018 | |
| WO | 2018148552 A1 | | 8/2018 | |
| WO | 2018204863 A1 | | 11/2018 | |
| WO | WO-2018223426 A1 | * | 12/2018 | ............... H04B 7/06 |
| WO | WO-2019028861 A1 | * | 2/2019 | ............... H04B 1/74 |
| WO | WO-2019087360 A1 | * | 5/2019 | ............ H04B 7/088 |
| WO | WO-2019098798 A1 | * | 5/2019 | ............ H04B 7/0695 |

OTHER PUBLICATIONS

PCT International Search Report and Written Opinion issued in International Application No. PCT/CN2019/121658 on Jan. 20, 2020, 15 pages (with English translation).

Extended European Search Report issued in European Application No. 19890318.9 on Feb. 7, 2022, 10 pages.

Office Action issued in Indian Application No. 202147025709 on Apr. 1, 2022, 7 pages.

Long et al., "The research and implementation of mobility robustness optimization in LTE system," Electronic Design Engineering, vol. 24, No. 9, May 2016, 3 pages (with English abstract).

Office Action issued in Chinese Application No. 201811444968.8 on Mar. 8, 2022, 4 pages.

* cited by examiner

INFORMATION TRANSMISSION METHOD AND APPARATUS

CROSS-REFERENCE TO RELATED APPLICATIONS

This application is a continuation of International Application No. PCT/CN2019/121658, filed on Nov. 28, 2019, which claims priority to Chinese Patent Application No. 201811444968.8, filed on Nov. 29, 2018. The disclosures of the aforementioned applications are herein incorporated by reference in their entireties.

TECHNICAL FIELD

This application relates to the communications field, and more specifically, to an information transmission method and apparatus.

BACKGROUND

Inappropriate handover (handover, HO) parameter settings have a negative impact on user experience. In addition, network resources are wasted due to a ping-pong handover, a handover failure, and a radio link failure. A radio link failure caused by an inappropriate handover parameter affects the user experience and the network resources.

In a long term evolution (long term evolution, LTE) system, it is very time-consuming to manually set a system handover parameter in the current system, and it is highly costly to update a mobility parameter after initial network deployment. In addition, in some cases, a radio resource management (radio resource management, RRM) in a network device can be used to detect a problem and adjust the mobility parameter. However, in some cases, the RRM cannot be used to resolve the problem. Therefore, mobility robustness optimization (mobility robust optimization, MRO) is proposed.

In the LTE system, the MRO optimization is mainly used to optimize the mobility parameter, such as an offset of an A3 handover event. Specifically, the network device determines, based on a radio link failure (radio link failure, RLF) report reported by a terminal device and a radio link failure indication (RLF indication) and a handover report (HO report) that are exchanged through an interface, whether the mobility parameter needs to be optimized.

Currently, in a multi-connectivity data transmission architecture in a new radio (new radio, NR) system or the LTE system, there is no good mechanism for accurately performing MRO in a timely manner.

SUMMARY

In view of this, this application provides an information transmission method and apparatus, to help a network device accurately perform MRO in a timely manner.

According to a first aspect, an information transmission method is provided. The method includes: A first network device sends first information to a terminal device, where the first information is used to indicate the terminal device to be handed over from a first cell to a second cell, the first cell is a cell served by a second network device, the second cell is a cell served by a third network device, and the second network device and the third network device are different network devices. The first network device receives second information sent by the terminal device, where the second information includes information about a radio link failure that occurs between the terminal device and the second cell, or the second information includes information about beam failure recovery that occurs between the terminal device and the second cell. The second information further includes information about a resource, and the information about the resource includes any one or more of information about a beam, information about an uplink carrier, or information about a bandwidth part. The first network device performs mobility robustness optimization based on the second information.

In some possible implementations, this embodiment of this application is applied to a multi-connectivity scenario. The first network device is a primary network device, and the second network device and the third network device are secondary network devices.

In some possible implementations, the first network device may be a network device in an LTE system or a network device in an NR system.

For example, the first network device is a master node (master node, MN), an MeNB, or an MgNB.

In some possible implementations, the second network device or the third network device may be a network device in an LTE system or a network device in an NR system.

For example, the second network device or the third network device is a secondary node (secondary mode, SN), an SeNB, or an SgNB.

According to the information transmission method in this embodiment of this application, in the multi-connectivity scenario, the terminal device adds the information about the resource to reported information, to help a network device accurately perform MRO in a timely manner.

With reference to the first aspect, in some implementations of the first aspect, when the second information includes the information about the beam failure recovery that occurs between the terminal device and the second cell, the second information further includes any one or more of a quantity of beam failures, a quantity of beam failure recovery times, or beam failure recovery duration.

In some possible implementations, when the second information includes any one or more of the quantity of beam failures, the quantity of beam failure recovery times, and the beam failure recovery duration, the second information further includes information about a beam corresponding to a beam failure or beam failure recovery.

According to the information transmission method in this embodiment of this application, when beam failure recovery occurs between the terminal device and a network device, the terminal device adds a quantity of beam failures, a quantity of beam failure recovery times, or beam failure recovery duration to the reported information, so that the network device determines a beam failure cause based on the information, thereby helping the network device accurately perform MRO in a timely manner.

With reference to the first aspect, in some implementations of the first aspect, that the first network device performs mobility robustness optimization based on the second information includes: The first network device sends third information to the second network device, where the third information is used to indicate a mobility parameter problem. Alternatively, the first network device sends fourth information to the third network device, where the fourth information is used to indicate a configuration problem of the resource.

That the third information is used to indicate a mobility parameter problem may also be understood as that the third information is used to indicate the second network device to adjust the mobility parameter. That the fourth information is used to indicate a configuration problem of the resource may also be understood as that the fourth information is used to indicate the third network device to adjust the configuration of the resource.

In some possible implementations, the third information further includes information used to indicate a granularity of the mobility parameter.

In some possible implementations, the granularity of the mobility parameter includes but is not limited to a cell granularity, a slice (slice) granularity, a supplementary uplink carrier (SUL) granularity, a bandwidth part (BWP) granularity, a beam (beam) granularity, or the like.

According to the information transmission method in this embodiment of this application, the terminal device may add the information about the resource to the information reported to the first network device, and the first network device determines a radio link failure cause or a beam failure cause. This helps the first network device accurately perform MRO in a timely manner in the multi-connectivity scenario.

With reference to the first aspect, in some implementations of the first aspect, after the first network device sends the fourth information to the third network device, the method further includes: The first network device receives fifth information sent by the third network device, where the fifth information is used to indicate an adjusted configuration of the resource.

In some possible implementations, the fifth information is used to indicate an adjusted configuration of a resource of the cell, and the fifth information includes the adjusted configuration of the resource, identification information of the cell, and the like.

According to the information transmission method in this embodiment of this application, after adjusting the configuration of the resource, the third network device may send the adjusted configuration of the resource to the first network device. This helps avoid a secondary node change failure and improve a secondary node change success rate.

With reference to the first aspect, in some implementations of the first aspect, the information about the beam includes an identifier of the beam and/or measurement information of the beam, and the identifier of the beam includes a group number of a synchronization signal block SSB and/or a group number of a channel state information reference signal CSI-RS. The information about the uplink carrier includes an identifier of the uplink carrier and/or measurement information of the uplink carrier, the identifier of the uplink carrier includes frequency information of the uplink carrier, and the uplink carrier includes a normal uplink carrier and/or a supplementary uplink carrier.

According to the information transmission method in this embodiment of this application, when the terminal device encounters a radio link failure in the multi-connectivity scenario, the information reported by the terminal device carries the information about the resource. This helps a primary network device accurately perform mobility robustness optimization in a timely manner, thereby helping avoid a secondary node change failure and improving a secondary node change success rate.

With reference to the first aspect, in some implementations of the first aspect, a protocol layer function of the second network device includes any one or more of a radio link control protocol layer function, a media access control layer function, and a physical layer function; and/or a protocol layer function of the third network device includes any one or more of a radio link control protocol layer function, a media access control layer function, and a physical layer function.

According to a second aspect, an information transmission method is provided. The method includes: A third network device receives second information from a terminal device, where the second information includes information about a radio link failure that occurs between the terminal device and a second cell, or the second information includes information about beam failure recovery that occurs between the terminal device and the second cell, and the second cell is a cell served by the third network device. The second information further includes information about a resource, and the information about the resource includes any one or more of information about a beam, information about an uplink carrier, or information about a bandwidth part. The third network device adjusts a configuration of the resource based on the second information. Alternatively, the third network device sends third information to a first network device, where the third information is used to indicate a mobility parameter problem.

With reference to the second aspect, in some implementations of the second aspect, when the second information includes the information about the beam failure recovery that occurs between the terminal device and the second cell, that a third network device receives second information from a terminal device includes: The third network device receives, by using a signaling radio bearer SRB3, the second information sent by the terminal device.

With reference to the second aspect, in some implementations of the second aspect, when the second information includes the information about the beam failure recovery that occurs between the terminal device and the second cell, the second information further includes any one or more of a quantity of beam failures, a quantity of beam failure recovery times, or beam failure recovery duration.

With reference to the second aspect, in some implementations of the second aspect, when the second information includes the information about the radio link failure that occurs between the terminal device and the second cell, that a third network device receives second information from a terminal device includes: The third network device receives the second information sent by the first network device.

With reference to the second aspect, in some implementations of the second aspect, the information about the beam includes an identifier of the beam and/or measurement information of the beam, and the identifier of the beam includes a group number of a synchronization signal block SSB and/or a group number of a channel state information reference signal CSI-RS. The information about the uplink carrier includes an identifier of the uplink carrier and/or measurement information of the uplink carrier, the identifier of the uplink carrier includes frequency information of the uplink carrier, and the uplink carrier includes a normal uplink carrier and/or a supplementary uplink carrier.

With reference to the second aspect, in some implementations of the second aspect, that the third network device adjusts a configuration of the resource based on the second information includes any one or more of the following: The third network device adjusts a first threshold corresponding to the SSB: the third network device adjusts a second threshold corresponding to the CSI-RS: the third network device adjusts a third threshold corresponding to the supplementary uplink carrier: or the third network device adjusts a random access channel RACH resource.

In some possible implementations, the information that is about the resource and that is reported by the terminal device includes the information (for example, identification information) about the beam (an SSB and/or a CSI-RS). The third network device determines that a BF is caused by an improper threshold configuration of the beam. That the third network device adjusts a configuration of the resource includes: The third network device adjusts a first threshold corresponding to the SSB; and/or the third network device adjusts a second threshold corresponding to the CSI-RS.

In some possible implementations, the information that is about the resource and that is reported by the terminal device includes the information (for example, identification information) about the beam and the information (for example, an identifier of the uplink carrier) about the uplink carrier. The third network device determines that a BF is caused by an improper threshold configuration of the beam and an improper threshold configuration of the uplink carrier. That the third network device adjusts a configuration of the resource includes: The third network device adjusts a first threshold corresponding to the SSB; the third network device adjusts a second threshold corresponding to the CSI-RS; and/or the third network device adjusts a third threshold corresponding to the supplementary uplink carrier.

With reference to the second aspect, in some implementations of the second aspect, a protocol layer function of the second network device includes any one or more of a radio link control protocol layer function, a media access control layer function, and a physical layer function; and/or a protocol layer function of the third network device includes any one or more of a radio link control protocol layer function, a media access control layer function, and a physical layer function.

According to a third aspect, an information transmission method is provided. The method includes: A first network device sends third information to a second network device, where the third information is used to indicate a mobility parameter problem.

With reference to the third aspect, in some possible implementations of the third aspect, the mobility parameter includes a CIO, a TTT, or the like of an A3 event or an A5 event.

According to a fourth aspect, an information transmission method is provided. The method includes: A second network device receives third information sent by a terminal device, where the third information is used to indicate a mobility parameter problem. The second network device adjusts the mobility parameter.

With reference to the fourth aspect, in some possible implementations of the fourth aspect, That the second network device adjusts the mobility parameter includes: The second network device adjusts a parameter such as a CIO and/or a TTT, where the parameter such as the CIO and/or the TTT is a parameter of an A3 event or an A5 event.

According to a fifth aspect, an information transmission method is provided. The method includes: A third network device receives, by using a signaling radio bearer SRB3, second information sent by a terminal device, where the second information includes information about beam failure recovery that occurs between the terminal device and a second cell.

With reference to the fifth aspect, in some possible implementations of the fifth aspect, the second information is a BFR report.

According to a sixth aspect, an information transmission method is provided. The method includes: A terminal device sends, by using a signaling radio bearer SRB3, second information to a third network device, where the second information includes information about beam failure recovery that occurs between the terminal device and a second cell.

With reference to the sixth aspect, in some possible implementations of the sixth aspect, the second information is a BFR report.

According to a seventh aspect, an information transmission method is provided. The method includes: A terminal device receives first information sent by a first network device, where the first information is used to indicate the terminal device to be handed over from a first cell to a second cell, the first cell is a cell served by a second network device, the second cell is a cell served by a third network device, and the second network device and the third network device are different network devices. The terminal device sends second information to the first network device, where the second information includes information about a radio link failure that occurs between the terminal device and the second cell, or the second information includes information about beam failure recovery that occurs between the terminal device and the second cell.

The second information further includes information about a resource, and the information about the resource includes any one or more of information about a beam, information about an uplink carrier, or information about a bandwidth part.

With reference to the seventh aspect, in some possible implementations of the seventh aspect, when the second information includes the information about the beam failure recovery that occurs between the terminal device and the second cell, the second information further includes any one or more of a quantity of beam failures, a quantity of beam failure recovery times, or beam failure recovery duration.

With reference to the seventh aspect, in some possible implementations of the seventh aspect, the information about the beam includes an identifier of the beam and/or measurement information of the beam, and the identifier of the beam includes a group number of a synchronization signal block SSB and/or a group number of a channel state information reference signal CSI-RS; and the information about the uplink carrier includes an identifier of the uplink carrier and/or measurement information of the uplink carrier, the identifier of the uplink carrier includes frequency information of the uplink carrier, and the uplink carrier includes a normal uplink carrier and/or a supplementary uplink carrier.

According to an eighth aspect, an information transmission apparatus is provided, and is configured to perform the method according to any one of the first aspect to the fifth aspect or the possible implementations of the first aspect to the fifth aspect. For example, the information transmission apparatus may include units configured to perform the method according to any one of the first aspect to the fifth aspect or the possible implementations of the first aspect to the fifth aspect.

According to a ninth aspect, an information transmission apparatus is provided, and is configured to perform the method according to any one of the sixth aspect, the seventh aspect, or the possible implementations of the sixth aspect or the seventh aspect. For example, the information transmission apparatus may include units configured to perform the method according to any one of the sixth aspect, the seventh aspect, or the possible implementations of the sixth aspect or the seventh aspect.

According to a tenth aspect, an information transmission apparatus is provided. The apparatus may be the network device (the first network device, the second network device, or the third network device) in the foregoing method designs or a chip disposed in the network device. The apparatus includes a processor. The processor is coupled to a memory, and may be configured to execute instructions in the memory, to implement the method according to any one of the first aspect to the fifth aspect, or the possible implementations of the first aspect to the fifth aspect. Optionally, the apparatus further includes the memory. Optionally, the apparatus further includes a communications interface, and the processor is coupled to the communications interface.

When the apparatus is the network device, the communications interface may be a transceiver or an input/output interface.

When the apparatus is a chip disposed in the network device, the communications interface may be an input/output interface.

Optionally, the transceiver may be a transceiver circuit. Optionally, the input/output interface may be an input/output circuit.

According to an eleventh aspect, an information transmission apparatus is provided. The apparatus may be the terminal device in the foregoing method designs, or may be a chip disposed in the terminal device. The apparatus includes a processor. The processor is coupled to a memory, and may be configured to execute instructions in the memory, to implement the method performed by the terminal device according to any one of the sixth aspect, the seventh aspect, or the possible implementations of the sixth aspect or the seventh aspect. Optionally, the apparatus further includes the memory. Optionally, the apparatus further includes a communications interface, and the processor is coupled to the communications interface.

When the apparatus is the terminal device, the communications interface may be a transceiver or an input/output interface.

When the apparatus is a chip disposed in the terminal device, the communications interface may be an input/output interface.

Optionally, the transceiver may be a transceiver circuit. Optionally, the input/output interface may be an input/output circuit.

According to a twelfth aspect, a program is provided. When being executed by a processor, the program is used to perform the methods according to the first aspect to the seventh aspect.

According to a thirteenth aspect, a program product is provided. The program product includes program code. When the program code is run by a communications unit and a processing unit or by a transceiver and a processor of an apparatus (for example, a network device or a terminal device), the apparatus is enabled to perform the method according to any one of the first aspect to the seventh aspect and the possible implementations of the first aspect to the seventh aspect.

According to a fourteenth aspect, a computer-readable medium is provided. The computer-readable medium stores a program, and the program enables an apparatus (for example, a network device or a terminal device) to perform the method according to any one of the first aspect to the seventh aspect and the possible implementations of the first aspect to the seventh aspect.

DESCRIPTION OF EMBODIMENTS

Figure 1:
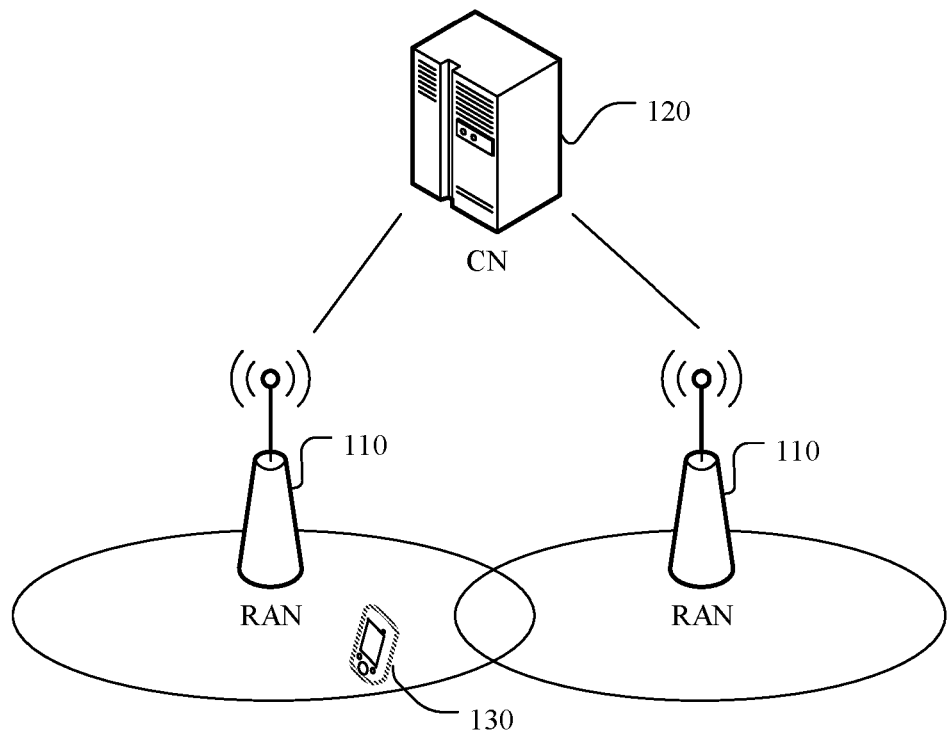
FIG. 1 is a schematic diagram of a communications system according to an embodiment of this application.

The following describes technical solutions of this application with reference to the accompanying drawings.

The technical solutions in embodiments of this application may be applied to various communications systems, such as a global system for mobile communications (global system for mobile communications, GSM) system, a code division multiple access (code division multiple access, CDMA) system, a wideband code division multiple access (wideband code division multiple access, WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunication system, UMTS), a worldwide interoperability for microwave access (worldwide interoperability for microwave access, WiMAX) communications system, and a future 5th generation (5th generation, 5G) system or a new radio (new radio, NR) system.

A terminal device in the embodiments of this application may be user equipment, an access terminal device, a subscriber unit, a subscriber station, a mobile station, a mobile console, a remote station, a remote terminal device, a mobile device, a user terminal device, a terminal device, a wireless communications device, a user agent, a user apparatus, or the like. The terminal device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device or a computing device having a wireless communication function, another processing device connected to a wireless modem, a vehicle-mounted device, a wearable device, a terminal device in a future 5G network, or a terminal device in a future evolved public land mobile network (public land mobile network, PLMN). This is not limited in the embodiments of this application.

A network device in the embodiments of this application may be a device configured to communicate with the terminal device. The network device may be a base transceiver station (base transceiver station, BTS) in a global system for mobile communications (global system for mobile communications, GSM) system or a code division multiple access (code division multiple access, CDMA) system, a NodeB (NodeB, NB) in a wideband code division multiple access (wideband code division multiple access, WCDMA) system, an evolved NodeB (evolved NodeB, eNB or eNodeB) in an LTE system, or a radio controller in a cloud radio access network (cloud radio access network, CRAN) scenario. Alternatively, the network device may be a relay node, an access point, a vehicle-mounted device, a wearable device, a network device in a future 5G network, a network device in a future evolved PLMN network, or the like. This is not limited in the embodiments of this application.

In the embodiments of this application, the terminal device or the network device includes a hardware layer, an operating system layer running on the hardware layer, and an application layer running on the operating system layer. The hardware layer includes hardware such as a central processing unit (central processing unit, CPU), a memory management unit (memory management unit, MMU), and a memory (also referred to as a main memory). The operating system may be any one or more computer operating systems that implement service processing by using a process (process), for example, a Linux operating system, a Unix operating system, an Android operating system, an iOS operating system, or a Windows operating system. The application layer includes applications such as a browser, an address book, word processing software, and instant communications software. In addition, a specific structure of an execution body of the method provided in the embodiments of this application is not specifically limited in the embodiments of this application, provided that a program that records code for the method provided in the embodiments of this application can be run to perform communication according to the method provided in the embodiments of this application. For example, the execution body of the method provided in the embodiments of this application may be a terminal device, a network device, or a functional module that is in a terminal device or a network device and that can invoke and execute the program.

In addition, aspects or features of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (compact disc, CD), a digital versatile disc (digital versatile disc, DVD)), a smart card and a flash memory component (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry instructions and/or data.

FIG. 1 is a schematic diagram of a communications system 100 according to an embodiment of this application. As shown in FIG. 1, a terminal device 130 accesses a wireless network, to obtain a service of an external network (for example, the internet) by using the wireless network, or to communicate with another terminal device by using the wireless network. The wireless network includes a RAN 110 and a core network (CN) 120. The RAN 110 is configured to connect the terminal device 130 to the wireless network, and the CN 120 is configured to manage the terminal device and provide a gateway for communicating with the external network.

It should be understood that the communication method provided in this application may be applicable to a wireless communications system, for example, the wireless communications system 100 shown in FIG. 1. There is a wireless communication connection between two communications apparatuses in the wireless communications system. One of the two communications apparatuses may correspond to the terminal device 130 shown in FIG. 1, for example, may be the terminal device 130 in FIG. 1, or may be a chip disposed in the terminal device 130. The other communications apparatus in the two communications apparatuses may correspond to the RAN 110 shown in FIG. 1, for example, may be the RAN 110 in FIG. 1, or may be a chip disposed in the RAN 110.

Without loss of generality, the following describes the embodiments of this application in detail by using an interaction process between a terminal device and a network device as an example. It may be understood that any terminal device in the wireless communications system may communicate, by using a same method, with one or more network devices having a wireless communication connection. This is not limited in this application.

Figure 2:
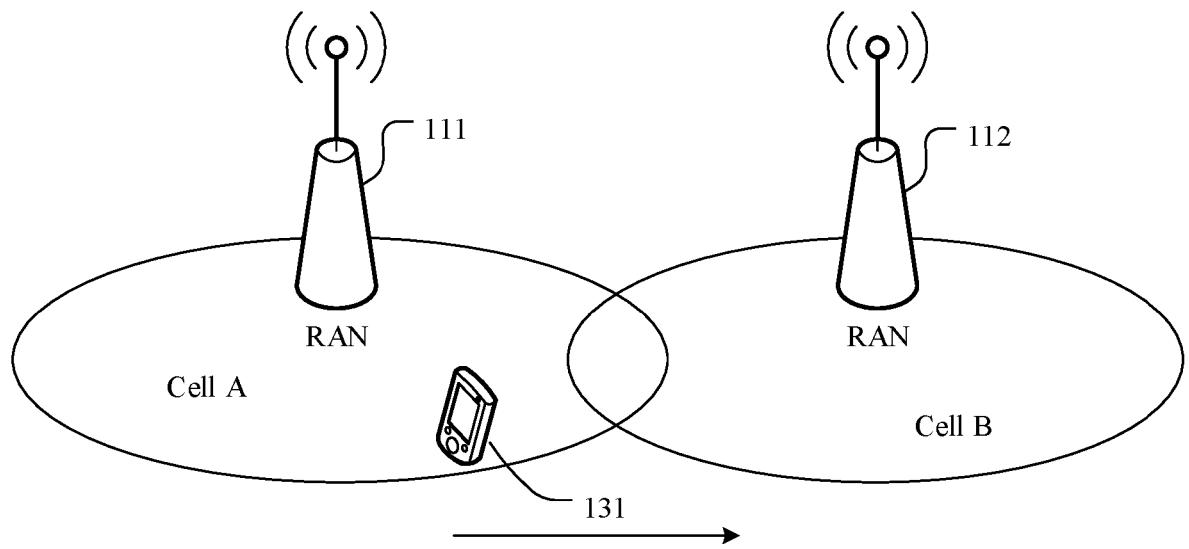
FIG. 2 is a schematic diagram of an application scenario of a technical solution according to an embodiment of this application.

FIG. 2 is a schematic diagram of an application scenario of a technical solution according to an embodiment of this application. As shown in FIG. 2, for example, a terminal device 131 is in a cell A served by a RAN 111. At a moment, the terminal device 131 receives a handover command (HO command) from the RAN 111, and the command indicates the terminal device 131 to be handed over to a cell B served by a RAN 112. An RLF occurs before the handover is completed. The terminal device 131 performs cell selection, selects the cell A, and attempts to perform radio resource control (radio resource control, RRC) reestablishment. The terminal device 131 reestablishes a connection to the cell A. After the reestablishment succeeds, the RAN 111 can identify this scenario as a premature handover.

For another example, as shown in FIG. 2, a terminal device 131 is in a cell A in a RAN 111. At a moment, the terminal device 131 receives an HO command from the RAN 111, and the command indicates the terminal device 131 to be handed over to a cell B served by a RAN 112. The terminal device 131 is successfully handed over to the cell B served by the RAN 112, and the RAN 112 sends context release information to the RAN 111 and starts a timer. An RLF occurs within a period of time after the handover is completed. The terminal device 131 performs cell reselection and selects the source cell A, and then attempts to reestablish an RRC connection. After RRC reestablishment is completed, the RAN 111 sends an RLF indication to the RAN 112. If the timer is still running when the RAN 112 receives the RLF indication, the RAN 112 sends a handover report (HO report) to the RAN 111, to indicate to the RAN 111 that the handover is a premature handover.

For another example, a terminal device 131 is in a cell A served by a RAN 111. At a moment, the terminal device 131 receives an HO command from the RAN 111, and the command indicates the terminal device 131 to be handed over to a cell B served by a RAN 112. An RLF occurs before the handover is completed. The terminal device 131 performs cell selection and selects the cell B, and performs RRC reestablishment. After the RRC is reestablished to the cell B, the RAN 112 sends an RLF indication to the RAN 111, where the RLF indication includes information such as an RLF report, and the RAN 111 can identify this scenario as a delayed handover.

For another example, a terminal device 131 is in a cell A served by the RAN 111. At a moment, the terminal device 131 receives an HO command from the RAN 111, and the command indicates the terminal device 131 to be handed over to a cell B served by a RAN 112. The terminal device 131 is successfully handed over to the cell B served by the RAN 112. Within a period of time after the handover is completed, the terminal device encounters a beam failure (BF) or beam failure recovery (BFR) in the cell B. In this case, because an RRC connection between the terminal device 131 and the cell B still exists, the terminal device 131 may report a beam failure recovery report (BFR report) to the RAN 112, and the RAN 112 may determine a cause for the beam failure. If it is determined that the beam failure is caused by a premature handover, the RAN 112 sends a handover report (HO report) to the RAN 111, to indicate the RAN 111 that the handover is a premature handover. Alternatively, if it is determined that the beam failure is not caused by a premature handover, the handover may be defined as another scenario, and a specific name of the another scenario is not limited in this embodiment of this application.

Figure 3:
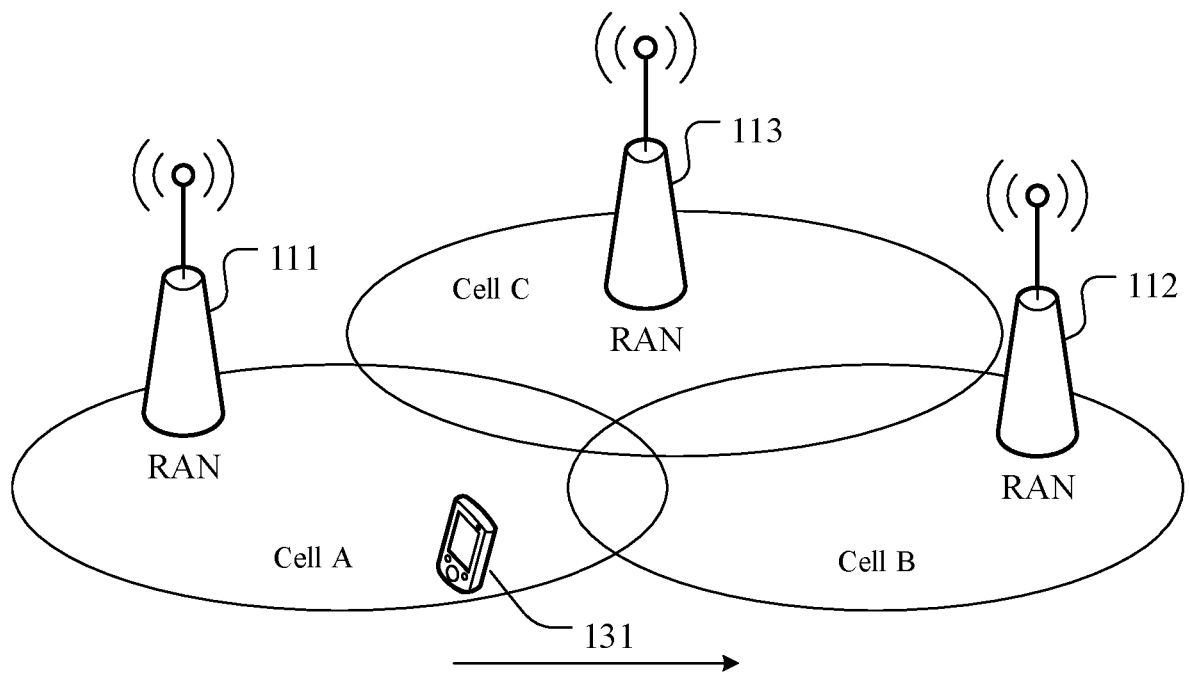
FIG. 3 is another schematic diagram of an application scenario of a technical solution according to an embodiment of this application.

FIG. 3 is another schematic diagram of an application scenario of a technical solution according to an embodiment of this application. As shown in FIG. 3, for example, a RAN 112 is a secondary node of a RAN 111. At a moment, a terminal device 131 receives secondary node change information (SN change) of the RAN 111, and the information indicates the terminal device 131 to be handed over from a cell B served by the RAN 112 to a cell C served by a RAN 113. In the change process, a failure occurs when the terminal device 131 initiates random access (random access, RA) to the RAN 113, or the terminal device successfully accesses the cell C served by the RAN 113. However, within a period of time, if an RLF occurs in the cell C, the terminal device 131 sends secondary cell group failure information (secondary cell group failure information, SCGfailureinfo) to the RAN 111, and the RAN 111 can identify this scenario as a premature secondary node change.

For another example, as shown in FIG. 3, before receiving the SN change, the terminal device encounters a radio link failure in the cell B served by the RAN 112. Within a subsequent period of time, the RAN 111 adds the RAN 113 as a secondary node. The terminal device 131 sends SCGfailureinfo to the RAN 111, and the RAN 111 can identify this scenario as a delayed secondary node change.

For another example, after the terminal device is handed over from the cell B served by the RAN 112 to the cell C served by the RAN 113, the terminal device is handed over from the cell C to the cell B within a period of time, or is repeatedly handed over between the cell B and the cell C for a plurality of times. The RAN 111 can identify this scenario as a ping-pong handover. Alternatively, the RAN 111 identifies, by using movement history (history) information reported by the terminal device 131, that this scenario as a ping-pong handover.

For another example, a RAN 111 triggers a terminal device 131 to add a RAN 112 as a secondary node. The terminal device 131 fails to initiate random access to the RAN 112, or the terminal device 131 successfully accesses a cell B served by the RAN 112. After a period of time, if a radio link failure occurs in the cell B, the terminal device 131 may send SCGfailureinfo to the RAN 111, and the RAN 111 can identify that this is a scenario of premature secondary node addition.

For another example, before receiving an indication for adding a RAN 112 as a secondary node, a terminal device 131 encounters a radio link failure in a RAN 111. In a subsequent period of time, the RAN 111 adds the RAN 112 as a secondary node. The terminal device 131 sends SCGfailureinfo to the RAN 111, and the RAN 111 may identify that this is a scenario of delayed secondary node addition.

Figure 4:
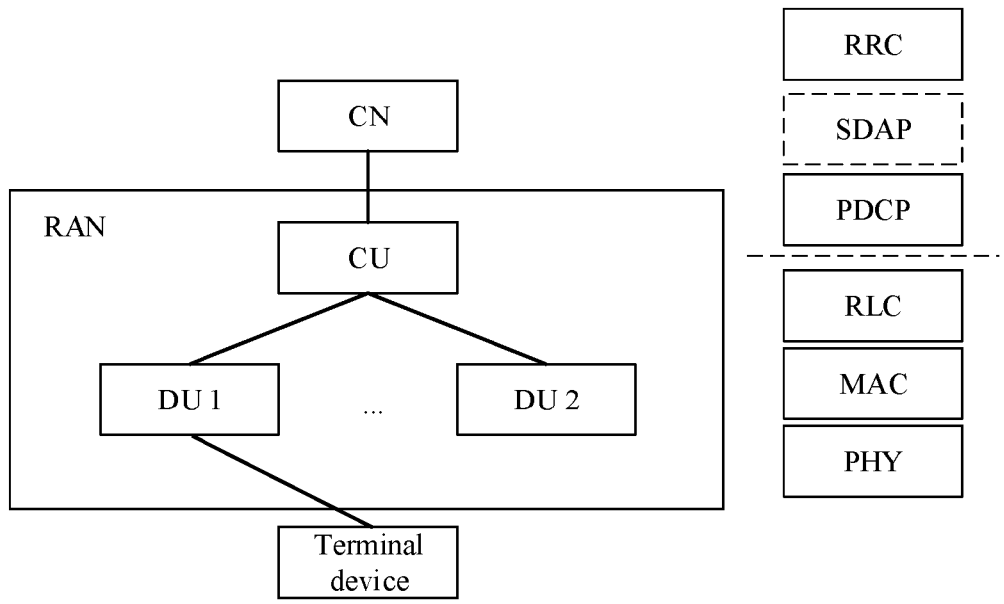
FIG. 4 is a schematic diagram of a network architecture according to an embodiment of this application.

FIG. 4 is a schematic diagram of a network architecture according to an embodiment of this application. As shown in FIG. 4, the network architecture includes a CN device and a RAN device. The RAN device includes a baseband apparatus and a radio frequency apparatus. The baseband apparatus may be implemented by one node, or may be implemented by a plurality of nodes. The radio frequency apparatus may be independently implemented remotely from the baseband apparatus, or may be integrated into the baseband apparatus, or a part of the radio frequency apparatus is implemented remotely from the baseband apparatus and a remaining part is integrated into the baseband apparatus. For example, in an LTE communications system, the RAN device (eNB) includes a baseband apparatus and a radio frequency apparatus. The radio frequency apparatus may be disposed remotely from the baseband apparatus. For example, a remote radio unit (remote radio unit, RRU) is disposed remotely from a BBU.

Communication between the RAN device and a terminal device complies with a specified protocol layer structure. For example, a control plane protocol layer structure may include functions of protocol layers such as a radio resource control (radio resource control, RRC) layer, a packet data convergence protocol (packet data convergence protocol, PDCP) layer, a radio link control (radio link control, RLC) layer, a media access control (media access control, MAC) layer, and a physical layer. A user plane protocol layer structure may include functions of protocol layers such as a PDCP layer, an RLC layer, a MAC layer, and a physical layer. In an implementation, a service data adaptation protocol (service data adaptation protocol, SDAP) layer may be further included above the PDCP layer.

The functions of these protocol layers may be implemented by one node, or may be implemented by a plurality of nodes. For example, in an evolved structure, the RAN device may include a centralized unit (centralized unit, CU) and a distributed unit (distributed unit, DU), and a plurality of DUs (for example, a DU 1 and a DU 2) may be all controlled by one CU. As shown in FIG. 4, division may be performed for the CU and the DU based on a protocol layer of a wireless network. For example, functions of the PDCP layer and a protocol layer above the PDCP layer are set on the CU, and functions of protocol layers below the PDCP layer, such as the RLC layer and the MAC layer, are set on the DU.

The RAN device may implement functions of protocol layers such as RRC, PDCP, RLC, and MAC by using one node or a plurality of nodes. For example, in an evolved structure, the RAN device may include a CU and DU, and a plurality of DUs may be all controlled by one CU. As shown in FIG. 4, division may be performed for the CU and the DU based on a protocol layer of a wireless network. For example, functions of the PDCP layer and a protocol layer above the PDCP layer are set on the CU. For example, the CU has functions of the PDCP layer and the RRC protocol layer. Functions of protocol layers below the PDCP layer, such as the RLC layer, the MAC layer, and the physical layer, may be set on the DU.

The division based on the protocol layer is merely an example, and the division may alternatively be performed based on another protocol layer, for example, the RLC layer. Functions of the RLC layer and protocol layers above the RLC layer are set on the CU, and functions of protocol layers below the RLC layer are set on the DU. Alternatively, the division is performed at a protocol layer, for example, a portion of functions of the RLC layer and functions of protocol layers above the RLC layer are set on the CU, and remaining functions of the RLC layer and functions of protocol layers below the RLC layer are set on the DU. In addition, the division may alternatively be performed in another manner, for example, the division is performed based on a delay: A function whose processing time needs to meet a delay requirement is set on the DU, and a function whose processing time does not need to meet the delay requirement is set on the CU.

In addition, the radio frequency apparatus may be not placed in the DU but is placed remotely from the DU, or may be integrated into the DU, or a part of the radio frequency apparatus is placed remotely from the DU and a remaining part is integrated into the DU. This is not limited herein.

Figure 5:
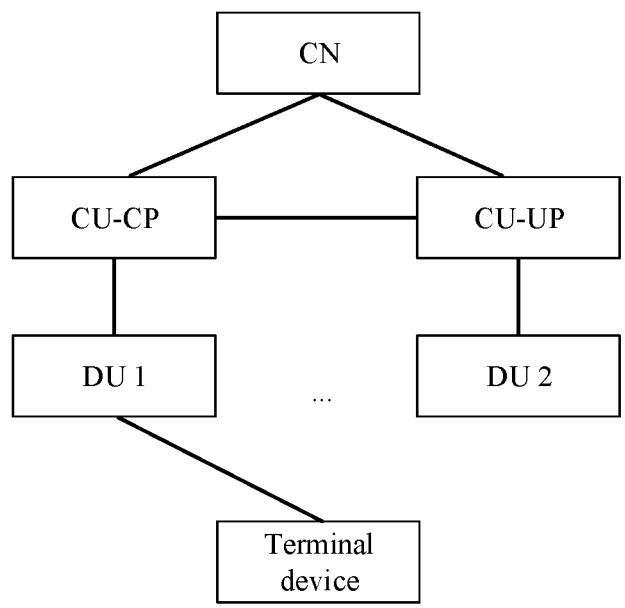
FIG. 5 is a schematic diagram of another network architecture according to an embodiment of this application.

FIG. 5 is a schematic diagram of another network architecture according to an embodiment of this application. Compared with the architecture shown in FIG. 4, a control plane (CP) and a user plane (UP) of a CU may be further separated into different entities for implementation, and the different entities are a control plane CU entity (CU-CP entity) and a user plane CU entity (CU-UP entity).

In the foregoing network architecture, signaling generated by the CU may be sent to a terminal device by using a DU (for example, a DU 1 or a DU 2), or signaling generated by a terminal device may be sent to the CU by using a DU. The DU may transparently transmit the signaling to the terminal device or the CU by directly encapsulating the signaling at a protocol layer without parsing the signaling. In the following embodiments, if transmission of such signaling between the DU and the terminal device is involved, that the DU sends or receives the signaling includes this scenario. For example, signaling at an RRC layer or a PDCP layer is finally processed as signaling at a PHY layer and sent to the terminal device, or is converted from received signaling at a PHY layer. In this architecture, the signaling at the RRC layer or the PDCP layer may also be considered to be sent by the DU or sent by the DU and a radio frequency.

In the foregoing embodiment, the CU is classified as a network device on a RAN side. In addition, the CU may alternatively be classified as a network device on a CN side. This is not limited herein.

An apparatus in the following embodiments of this application may be located in the terminal device based on functions implemented by the apparatus. When the foregoing CU-DU structure is used, the network device may be a CU node, a DU node, or a RAN device including a CU node and a DU node.

In an NR system, a concept of a beam is introduced, so that a random access process in a mobility handover process relates to how to select a beam. Currently, a beam may include a synchronization signal block (synchronization signal block, SSB) and/or a channel state information reference signal (channel state information RS, CSI-RS), and the CSI-RS may be used for random access in a non-contention-based scenario. The beam may be configured by using RRC, the SSB is sent to the terminal device by using a broadcast message, and the CSI-RS may be configured for the terminal device by using RRC dedicated signaling. For example, in a handover process, after receiving a handover request message sent by a source base station, a target base station returns a handover request response. The handover request response includes a beam configuration sent to the terminal device. The network device configures a beam selection threshold for the UE, including two thresholds (for example, rsrp-ThresholdSSB and csirs-Threshold) related to the SSB and the CSI-RS. The threshold is used by the terminal device to select a beam. The network device may configure measurement information that is related to the SSB or the CSI-RS for the terminal device, and the terminal device measures reference signal received power (reference signal receiving power, RSRP) of the SSB or RSRP of the CSI-RS. For example, when the RSRP obtained by the terminal device by measuring the SSB exceeds the RSRP threshold of the SSB, a random access resource corresponding to the SSB is selected to perform random access.

In addition, a supplementary uplink (supplementary uplink, SUL) carrier is further introduced to the NR system, that is, one downlink supports two uplink carriers. In this case, a corresponding SUL threshold (sul-RSRP-Threshold) is also introduced. To be specific, when the terminal device initially performs random access, the terminal device determines, by comparing measured signal strength with the SUL threshold, whether to select a normal uplink (normal uplink, UL) carrier or the SUL. When the terminal device is in a handover scenario, whether the terminal device uses the UL or the SUL or both the UL and the SUL may be indicated by using the RRC dedicated signaling.

In an LTE system, MRO optimization is mainly used to optimize a mobility parameter, such as an offset or a time to trigger (timer to trigger, TTT) of an A3 handover event. For example, the network device determines, based on a radio link failure (RLF) report reported by the terminal device, an RLF indication exchanged through an interface, and an HO report, whether a mobility parameter needs to be optimized.

In the NR system, MRO optimization is not introduced temporarily. If the NR system inherits the LTE solution, because beam-related beam selection, a UL/SUL, and a bandwidth part are introduced into the NR system, and the beam selection, the SUL, or the bandwidth part may cause a radio link failure, which cannot be distinguished and resolved in the current technology. An embodiment of this application provides an information transmission method. In a multi-connectivity scenario, when encountering an RLF or a BF, a terminal device may report a radio link failure report (RLF report) or a beam failure recovery report (BFR report) to a network device. The RLF report or the BFR report carries one or more of information about a beam, information about an uplink carrier, or information about a bandwidth part. This helps the network device accurately perform MRO in a timely manner.

Figure 6:
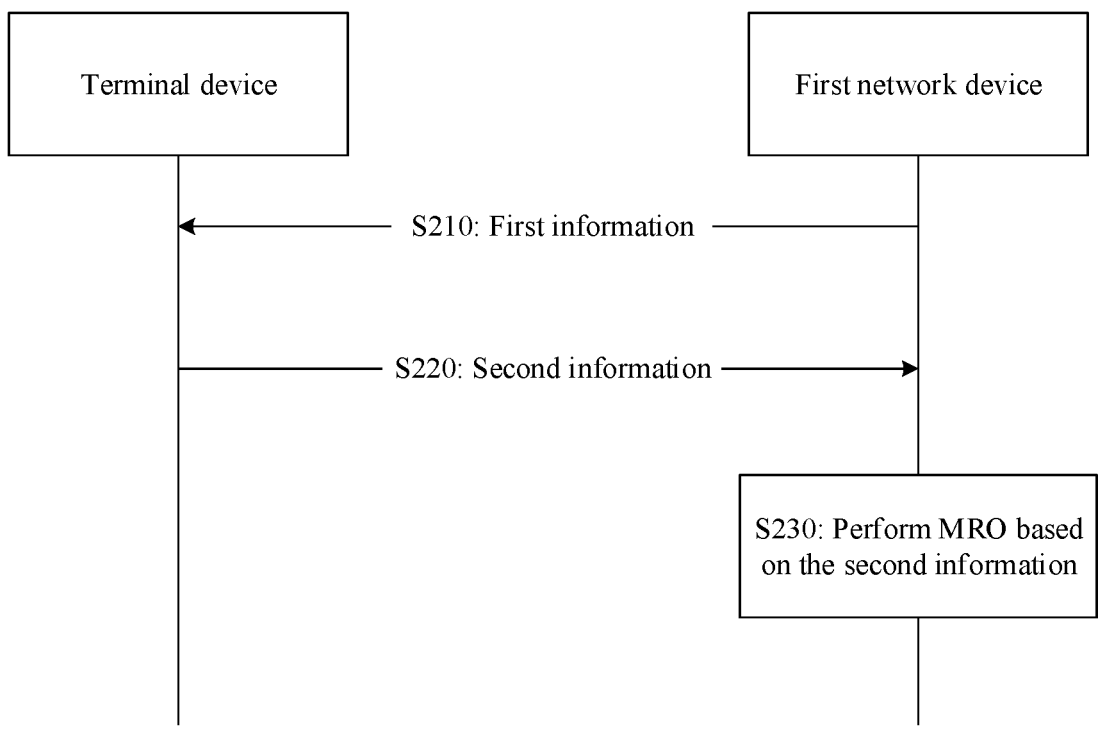
FIG. 6 is a schematic flowchart of an information transmission method according to an embodiment of this application.

FIG. 6 is a schematic flowchart of an information transmission method 200 according to an embodiment of this application. As shown in FIG. 6, the method 200 may be performed by a network device, or may be performed by a chip in a network device (the following uses an example in which an execution body is a network device for description). The method 200 includes the following steps.

S210: A first network device sends first information to a terminal device, where the first information is used to indicate the terminal device to be handed over from a first cell to a second cell, the first cell is a cell served by a second network device, the second cell is a cell served by a third network device, and the second network device and the third network device are different network devices.

Optionally, the first network device is a primary network device, and the second network device and the third network device are secondary network devices.

Optionally, in this embodiment of this application, the first network device may trigger the terminal device to be handed over from the first cell to the second cell, or the second network device may trigger the terminal device to be handed over from the first cell to the second cell.

Optionally, when the second network device triggers the terminal device to be handed over from the first cell to the second cell, the method 200 further includes:

The first network device receives change indication information sent by the second network device, to indicate to hand over the terminal device from the first cell to the second cell.

It should be understood that, in this embodiment of this application, that the terminal device is handed over from the first cell to the second cell may also be understood as that the terminal device is handed over from the second network device to the third network device.

S220: The first network device receives second information sent by the terminal device, where the second information includes information about a radio link failure that occurs between the terminal device and the second cell, or the second information includes information about beam failure recovery that occurs between the terminal device and the second cell. The second information further includes information about a resource, and the information about the resource includes any one or more of information about a beam, information about an uplink carrier, or information about a bandwidth part.

Optionally, the second information includes the information about the radio link failure that occurs between the terminal device and the second cell.

Optionally, the second information is secondary cell group failure information (secondary cell group failure information, SCGfailureinfo).

It should be understood that the information about the resource is information about a resource used when the terminal device encounters the radio link failure.

It should be further understood that a radio link failure report includes at least one of information about the radio link failure and the information about the resource used when the radio link failure occurs.

It should be understood that the technical solution in this embodiment of this application may be applied to a cell (or secondary node) change scenario. As shown in FIG. 3, the terminal device 131 may send SCGfailureinfo to the RAN 111, where SCGfailureinfo carries the information about the resource, so that the RAN 111 determines whether this scenario is a scenario in which a mobility parameter is improperly configured or a scenario in which a resource is improperly configured.

Optionally, the information that is about the resource and that is recorded by the terminal device includes the information about the resource used when the terminal device encounters the RLF, or may be information about a resource already used (or once used) when the RLF occurs, or may be information about a resource used for a last service when the RLF occurs, or may be information about a resource used by the terminal device before the RLF occurs.

Optionally, the information about the resource includes the information about the beam, and the information about the beam includes but is not limited to one or more of the following: an identifier of the beam, random access information of the terminal device on the beam, information about a cell to which the beam belongs (a physical cell identifier (physical cell identifier, PCI), a cell global identifier (cell global identifier, CGI), cell frequency (frequency) information, a cell type (for example, a CD (cell defining, CD)-SSB or a non-CD-SSB)), and measurement information of the terminal device on the beam (including measurement of an adjacent beam and measurement of a serving beam). Optionally, the information about the beam further includes measurement information of a cell in which the beam is located and measurement information of a cell in which the adjacent beam is located.

Optionally, the identifier of the beam may be a group number (for example, an SSB-index and a CSI-RS-index) of the beam.

Optionally, the information about the radio link failure includes but is not limited to one or more of the following:
(1) a time period from a time at which the terminal device performs cell change to a time at which a connection failure occurs, and/or a time period from a time at which the terminal device performs cell change to a time of SCGfailureinfo reporting;
(2) a cause for the RLF of the terminal device, where the cause may include, for example, at least one of the following: a timer expiring, a random access problem, a beam recovery failure problem, a quantity of RLC retransmissions reaching a maximum value;

(3) an indication of a connection failure of the terminal device, where the connection failure may include, for example, a cell change failure, a beam recovery failure, or a radio link failure;

(4) a cell radio network temporary identifier (cell radio network temporary identifier, C-RNTI) assigned by the cell to the terminal device in the last service;

(5) information (for example, any one or more types of indications of a CGI, a PCI, and a CD-SSB) about a cell in which the terminal device performs reestablishment, and information (for example, an SSB-index and a CSI-RS-index) about a beam used for the reestablishment; and (6) a time period from a time at which the terminal device encounters a beam failure to a time at which the terminal device encounters the radio link failure, and/or a quantity of beam failures.

Optionally, the random access information includes but is not limited to one or more of the following: a quantity of preamble attempts (number of preambles sent), preamble information used in a preamble attempt, contention indication information (contention detected), load information of a random access channel, load information of a physical uplink shared channel, maximum power arrival indication information, failure duration information, access delay information, path loss estimation information, backoff time (backoff time) information, information about data available for transmission (data available for transmission), and a random access type.

The quantity of preamble attempts may be information about a quantity of attempts, to send a preamble for access, made by the terminal device in a process from initiating preamble transmission to successfully performing random access to a network.

The contention indication information may be information about whether contention resolution fails or whether contention of the preamble is detected.

The maximum power arrival indication information may be information about whether a transmitted preamble reaches a maximum power level.

The failure duration information may be information about a time of making a random access attempt by the terminal device.

The access delay information may be information about a time period from a time at which the terminal device initiates preamble transmission to a time at which random access succeeds.

The path loss estimation information may be path loss information when the terminal device makes a random access attempt.

The backoff time information may be information about a delay time of a network backoff control mechanism in a random access process.

The random access type may include at least one of on demand system information (on demand system information), RRC connection establishment, and beam failure recovery (BFR). The random access type of the on demand system information may further include at least one of a type of a random access process message 1 (message 1, Msg1) request and a type of a random access process message 3 (message 3, Msg3) request.

Optionally, when the cause for the RLF of the terminal device is the random access problem or the beam recovery failure problem, the information about the resource includes the random access information, and the random access information includes information about a beam used when random access fails and/or information about a beam used when random access succeeds.

Optionally, the information about the resource includes the information about the uplink carrier, and in a description similar to that of the information about the beam, the identifier of the beam may be replaced with an identifier of the uplink carrier. The identifier of the uplink carrier may be any one or more of frequency information of the uplink carrier, an uplink carrier identifier, and the like, and the uplink carrier may be an SUL or a UL.

Optionally, the information about the uplink carrier is information about an uplink carrier used when the terminal device encounters the RLF, or may be information about an uplink carrier used before the terminal device encounters the RLF.

Optionally, the information about the resource includes the information about the bandwidth part, and in a description similar to that of the information about the beam, the identifier of the beam is replaced with an identifier of the BWP. The information about the BWP may further include any one or more of the following: a location and a bandwidth (location and bandwidth), a subcarrier spacing (subcarrier spacing), information used in uplink of the BWP, and information used in downlink of the BWP. The information used in uplink or downlink of the BWP may include any one or more of the following: a common configuration, a dedicated configuration, and the like.

Optionally, the information about the bandwidth part is the information about a bandwidth part used when the terminal device encounters the RLF, or may be information about a bandwidth part used before the terminal device encounters the RLF.

It should be understood that, in this embodiment of this application, the second information may be sent to the network device by using the existing SCGfailureinfo, may be sent by using another existing message or report, or may be sent by using a new report or message. Alternatively, content in the second information may be combined and sent or may be separately sent. This is not limited in this application.

Optionally, the second information includes information about a beam failure that occurs between the terminal device and the second cell.

Optionally, the second information is a beam failure recovery report (BFR report), and the BFR report includes information about the beam failure and the information about the resource.

For example, as shown in FIG. 3, after the terminal device 131 successfully accesses the cell C served by the RAN 113, a BF occurs in the cell C but BFR succeeds within a period of time. The terminal device 131 may send a BFR report to the RAN 111, and the RAN 111 performs MRO after determining a cause for the BF. Alternatively, the terminal device 131 may send a BFR report to the RAN 113, and the RAN 113 performs MRO after determining a cause for the BF.

Optionally, the information that is about the resource and that is recorded by the terminal device includes information about a resource used when the terminal device encounters the BFR/BF, or may be information about a resource already used (or once used) when the BFR/BF occurs, or may be information about a resource used for a last service when the BFR/BF occurs, or may be information about a resource used by the terminal device before the BFR/BF occurs.

Optionally, descriptions of information about a beam, information about an uplink carrier, and information about a bandwidth part that are included in the information about the resource are similar to those in the foregoing descriptions. For brevity, details are not described herein again.

Optionally, the information about the beam failure includes but is not limited to one or more of the following:
(1) a time period from a time at which the terminal device encounters the beam failure to a time at which the beam failure recovery succeeds, and/or a time period from a time at which the terminal device encounters the beam failure to a time at which the BFR report is reported;
(2) a cause for the beam failure of the terminal device, where the cause may include, for example, at least one of the following: a timer expiring, a random access problem, a quantity of RLC retransmissions reaching a maximum value, and the like;
(3) a cell radio network temporary identifier (cell radio network temporary identifier, C-RNTI) assigned by the cell to the terminal device in the last service; and
(4) information (for example, a CGI and a PCI) about a cell in which the terminal device performs reestablishment, and/or information (for example, an SSB-index and a CSI-RS-index) about a beam used for the reestablishment.

Optionally, the first information further includes at least one of a quantity of beam failures, a quantity of beam failure recovery times, or beam failure recovery duration.

Optionally, when the first information includes at least one of the quantity of beam failures, the quantity of beam failure recovery times, or the beam failure recovery duration, the first information further includes information about a beam on which the beam failure occurs. Optionally, the first information may further include information about an uplink carrier on which the beam failure occurs and/or information about a BWP in which the beam failure occurs.

Optionally, at least one of the quantity of beam failures, the quantity of beam failure recovery times, or the beam failure recovery duration may alternatively be directly included in the BFR report.

S230: The first network device performs mobility robustness optimization based on the second information.

Optionally, in this embodiment of this application, that the first network device performs mobility robustness optimization based on the second information includes: The first network device determines the cause for the RLF or the BF. Alternatively, the first network device forwards the second information to the second network device or the third network device, and the second network device or the third network device determines the cause for the RLF or the BF. The following describes a specific optimization process performed by the network device in detail with reference to FIG. 7 to FIG. 18.

Figure 7:
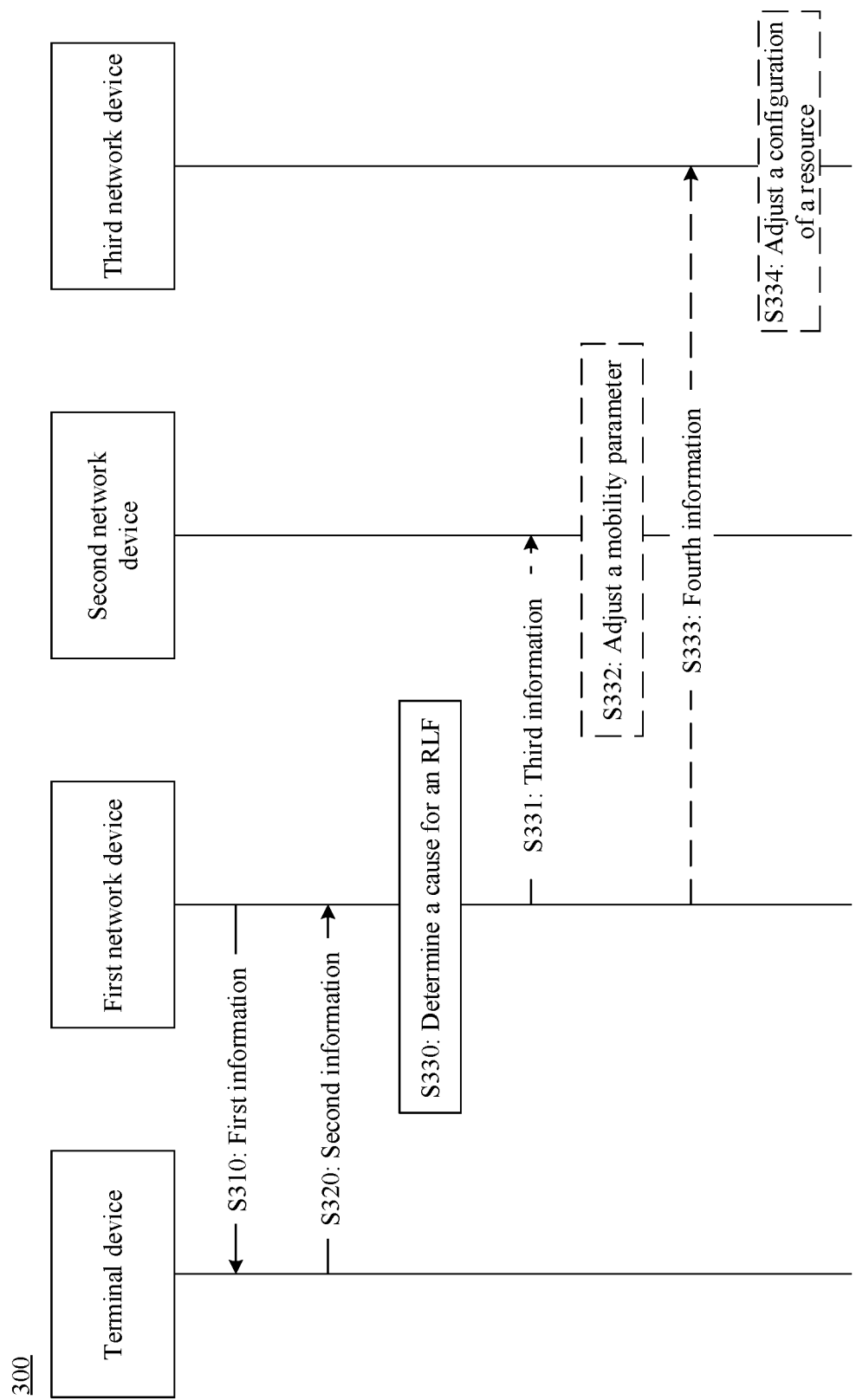
FIG. 7 is another schematic flowchart of an information transmission method according to an embodiment of this application.

FIG. 7 is a schematic flowchart of an information transmission method 300 according to an embodiment of this application. As shown in FIG. 7, the method 300 includes the following steps.

S310: A first network device sends first information to a terminal device, where the first information is used to indicate the terminal device to be handed over from a first cell to a second cell, the first cell is a cell served by a second network device, the second cell is a cell served by a third network device, and the second network device and the third network device are different network devices.

Optionally, before the first network device sends the first information to the terminal device, the method 300 further includes:

The first network device receives cell change indication information sent by the second network device, where the cell change indication information is used to indicate to hand over the terminal device from the first cell to the second cell.

For example, the first network device may be the RAN 111 in FIG. 3, the second network device may be the RAN 112 in FIG. 3, and the third network device may be the RAN 113 in FIG. 3. As shown in FIG. 3, the RAN 111 is a master node, and the RAN 112 and the RAN 113 are secondary nodes. The RAN 111 may trigger the terminal device to be handed over from the cell B served by the RAN 112 to the cell C served by the RAN 113, or the RAN 112 may trigger the terminal device to be handed over from the cell B served by the RAN 112 to the cell C served by the RAN 113.

S320: The terminal device sends second information to the first network device, where the second information includes information about a radio link failure that occurs between the terminal device and the second cell. The second information further includes information about a resource, and the information about the resource includes any one or more of information about a beam, information about an uplink carrier, or information about a bandwidth part.

Optionally, the second information is SCGfailureinfo.

Optionally, before the terminal device sends the second information to the first network device, the method 300 further includes:

The terminal device initiates random access to the second cell served by the third network device, and fails in the random access.

Optionally, before the terminal device sends the second information to the first network device, the method 300 further includes:

The terminal device initiates random access to the second cell served by the third network device, and succeeds in the random access.

The terminal device encounters a radio link failure in the second cell.

Optionally, before the terminal device sends the second information to the first network device, the method 300 further includes:

The terminal device initiates random access to the second cell served by the third network device, and succeeds in the random access.

The terminal device is handed over, within a very short period of time, from the second cell served by the third network device to the first cell served by the second network device.

S330: The first network device determines a cause for the radio link failure.

Optionally, that the first network device determines a cause for the radio link failure includes:

The first network device determines that the radio link failure is caused by an improper configuration of a mobility parameter.

Optionally, the first network device determines that the mobility problem is a premature change, a delayed change, or a ping-pong change.

Optionally, the first network device determines one or more of an improper configuration of a cell-specific mobility parameter, an improper configuration of a slice-specific mobility parameter, an improper configuration of a beam-specific mobility parameter, an improper configuration of an uplink-carrier-specific mobility parameter, an improper configuration of a bandwidth-part-specific mobility parameter, or the like.

The method 300 further includes:

S331: The first network device sends third information to the second network device, and the second network device receives the third information sent by the first network device, where the third information is used to indicate a mobility parameter problem.

Optionally, that the third information is used to indicate a mobility parameter problem may also be understood as that the third information is used to indicate the second network device to adjust the mobility parameter.

Optionally, the third information includes information used to indicate a granularity of the mobility parameter.

Specifically, the third information includes the granularity of the mobility parameter. After receiving the third information, the second network device may determine the granularity of the to-be-modified mobility parameter.

Optionally, the granularity of the mobility parameter includes a cell granularity, a slice (slice) granularity, a supplementary uplink carrier (SUL) granularity, a bandwidth part (BWP) granularity, a beam (beam) granularity, or the like.

Specifically, the third information includes one or more of a cell-specific mobility parameter modification indication, a slice-specific mobility parameter modification indication, a beam-specific mobility parameter modification indication, an uplink-carrier-specific mobility parameter modification indication, or a bandwidth-part-specific mobility parameter modification indication. After receiving the third information, the second network device may determine that the to-be-modified mobility parameter is a cell-specific, a slice-specific, a beam-specific, an uplink-carrier-specific, or a bandwidth-part-specific mobility parameter.

Optionally, the first network device may explicitly indicate the second network device to adjust the mobility parameter, or may implicitly indicate the second network device to adjust the mobility parameter.

Explicit indication: The third information includes two fields. One field is used to indicate the second network device to adjust the mobility parameter, and the other field is used to indicate the granularity of the mobility parameter. After receiving the third information, the second network device may learn that the second network device needs to modify the mobility parameter, and learn of the granularity of the to-be-modified mobility parameter by using the other field.

Specifically, if the cell-specific mobility parameter needs to be modified, the third information includes a mobility modification indication and a cell identifier (for example, a PCI, a CGI, a cell ID, and a CD-SSB type): if the slice-specific mobility parameter needs to be modified, the third information includes one or more of a mobility modification indication, a slice identifier (such as an S-NSSSID or an NSSID), and a cell identifier: if the beam-specific mobility parameter needs to be modified, the third information includes one or more of a mobility modification indication, a beam identifier (for example, an SSB-index or a CSI-RS-index), and a cell identifier; if the uplink-carrier-specific mobility parameter needs to be modified, the third information includes one or more of a mobility modification indication, an uplink carrier identifier (for example, a frequency or an ID of an uplink carrier), and a cell identifier: or if the bandwidth-part-specific mobility parameter needs to be modified, the third information includes one or more of a mobility modification indication, a bandwidth part identifier, and a cell identifier.

Implicit indication: The third information includes one field, and the field is used to indicate the mobility parameter. After receiving the third information, the second network device may implicitly learn that the second network device needs to modify the mobility parameter, and learn of the granularity of the to-be-modified mobility parameter by using the field.

Optionally, the third information may not carry the information used to indicate the granularity of the mobility parameter. After receiving the third information, the second network device may independently determine the granularity of the to-be-modified mobility parameter.

Optionally, the third information includes a type of a scenario in which the mobility parameter problem is caused, and specifically includes at least one of scenarios such as a premature SN handover, a delayed SN handover, and a ping-pong SN handover.

Optionally, the third information further includes at least one of identification information of the terminal device at a source secondary station or in a cell served by a source secondary station, identification information of a secondary station serving a cell in which the terminal device encounters a radio link failure, identification information of a secondary station serving a cell in which the terminal device successfully performs reestablishment, or a radio link failure report.

S332: The second network device adjusts the mobility parameter.

Optionally, that the second network device adjusts the mobility parameter includes:

The second network device adjusts parameters such as a cell individual offset (cell individual offset, CIO) and/or a time to trigger (time to trigger, TTT) threshold and/or a hysteresis (hysteresis). For example, the CIO is a CIO parameter in events A3, A4, and A5, and the hysteresis is a hysteresis parameter in A3, A4, A5, B1, and B2.

Optionally, the second network device adjusts one or more of the cell-specific mobility parameter, the slice-specific mobility parameter, the beam-specific mobility parameter, the uplink-carrier-specific mobility parameter, or the bandwidth-part-specific mobility parameter.

Optionally, the method 300 further includes:

The second network device sends a modified mobility parameter to the first network device; and The first network device sends the modified mobility parameter to the terminal device.

Alternatively, the second network device directly sends the modified mobility parameter to the terminal device.

Optionally, that the first network device determines a cause for the radio link failure includes:

The first network device determines that the radio link failure is caused by an improper configuration of the resource.

The method 300 further includes:

S333: The first network device sends fourth information to the third network device, and the third network device receives the fourth information sent by the first network device, where the fourth information is used to indicate a configuration problem of the resource.

For example, the fourth information is used to indicate the third network device to adjust a configuration of the resource in a cell. For example, the fourth information includes one or more of the following: a type of a configuration problem of the resource, a configuration adjustment indication of the resource, and identification information of the cell.

S334: The third network device adjusts the configuration of the resource.

Optionally, the resource includes one or more of a beam, an uplink carrier, or a bandwidth part, and that the third network device adjusts the configuration of the resource includes any one or more of the following:

the first network device adjusts a first threshold corresponding to an SSB, that is, adjusts a first threshold corresponding to the SSB in a cell;

the first network device adjusts a second threshold corresponding to the CSI-RS, that is, adjusts a second threshold corresponding to the CSI-RS in a cell;

the first network device adjusts a third threshold corresponding to the supplementary uplink carrier, that is, adjusts a third threshold corresponding to the supplementary uplink carrier in a cell; or the first network device adjusts a RACH resource, that is, adjusts a RACH resource in a cell, for example, a time-frequency resource corresponding to each SSB or CSI-RS, or a preamble group included in each SSB or CSI-RS, or properly adjusts parameters such as initial transmit/receive power and a step of a preamble.

Optionally, the fourth information is used to indicate the third network device to adjust a configuration of a specific resource, and the configuration of the specific resource is one or more of a beam, an uplink carrier, or a bandwidth part.

Optionally, the method 300 further includes:

The third network device sends fifth information to the first network device, and the first network device receives the fifth information sent by the third network device, where the fifth information is used to indicate an adjusted configuration of the resource.

For example, the fifth information is used to indicate an adjusted configuration of a resource in the cell, and the fifth information includes the adjusted configuration of the resource, identification information of the cell, and the like.

It should be understood that when the second network device determines that the radio link failure is caused by the improper configuration of the mobility parameter, the second network device determines that there is a cell change problem (for example, a premature change or a delayed change) and adjusts the mobility parameter.

It should be noted that information exchanged between the first network device and the second network device and information exchanged between the first network device and the third network device each are exchanged by using an interface message between the network devices, such as an existing Xn interface message or EN-DC X2 interface message, or a newly defined Xn interface message or EN-DC X2 interface message. This is not limited in this embodiment of this application.

In this embodiment of this application, if the first network device determines that there is a resource configuration problem, the first network device indicates the third network device to adjust the configuration of the resource, for example, adjust a configuration of a threshold related to a beam or an SUL, for a subsequent handover configuration. Otherwise, if the first network device determines that there is a mobility parameter problem rather than a resource configuration problem, the first network device indicates the second network device to adjust the mobility parameter. The second network device determines that this scenario is a premature cell change scenario or another newly defined scenario, and then adjusts a related mobility parameter.

Optionally, a protocol layer function of the second network device includes any one or more of a radio link control protocol layer function, a media access control layer function, and a physical layer function; and/or a protocol layer function of the third network device includes any one or more of a radio link control protocol layer function, a media access control layer function, and a physical layer function.

Specifically, the method 300 may be further applied to a CU-DU scenario. The second network device may be a DU of a source secondary network device, and the third network device may be a DU of a target secondary network device.

Optionally, a protocol layer function of the first network device includes any one or more of a radio resource control protocol layer function, a service data adaptation layer function, and a packet data convergence protocol layer function.

It should be noted that, in the CU-DU scenario, information exchanged between the first network device and the second network device and information exchanged between the first network device and the third network device each are exchanged by using an interface message between a CU and a DU, such as an existing F1 interface message or a newly defined F1 interface message. This is not limited in this embodiment of this application.

According to the information transmission method in this embodiment of this application, when a terminal device encounters a radio link failure in a multi-connectivity scenario, information reported by the terminal device carries information about a resource. This helps a primary network device accurately perform mobility robustness optimization in a timely manner, thereby helping avoid a secondary node change failure and improving a secondary node change success rate.

Figure 8:
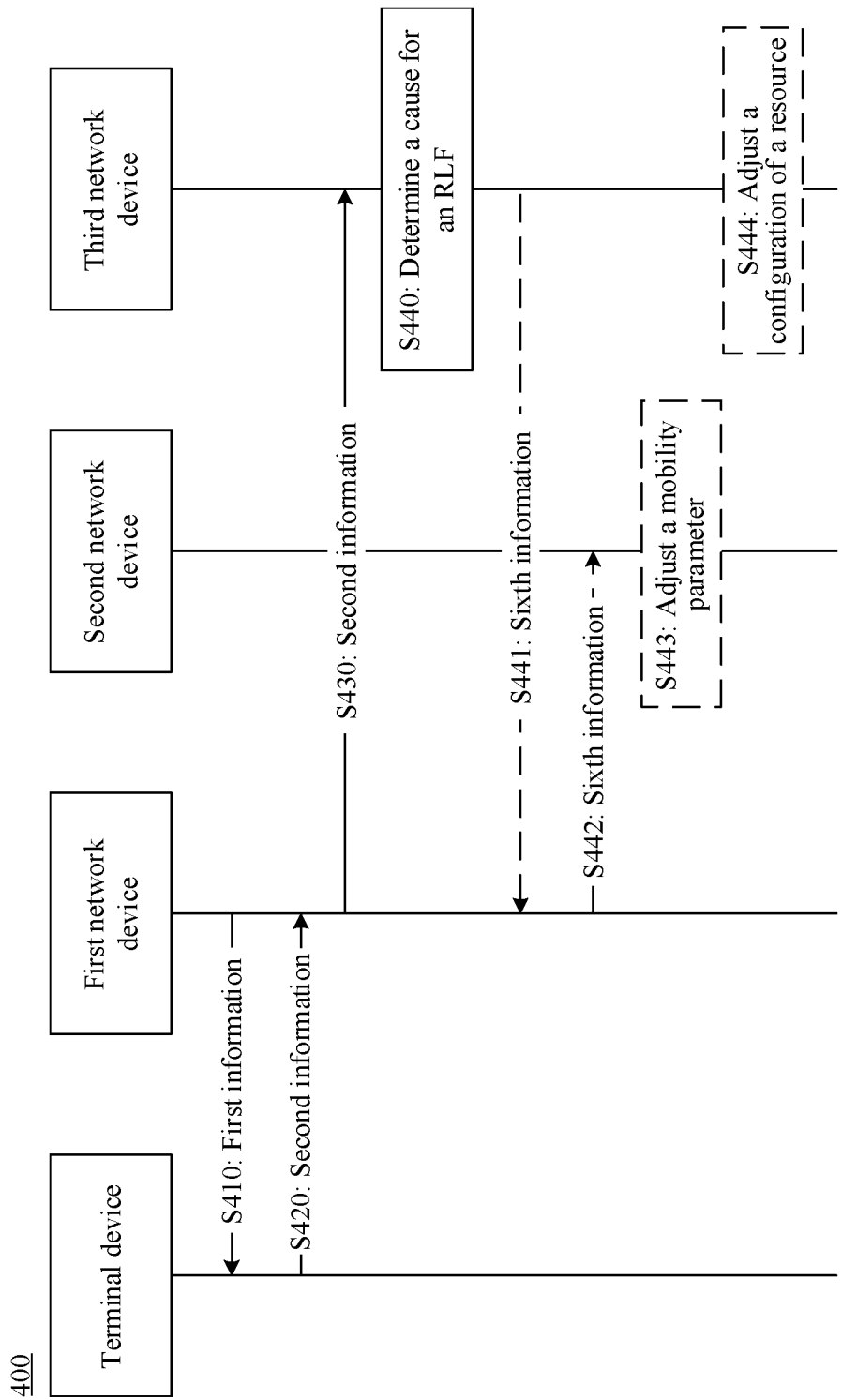
FIG. 8 is another schematic flowchart of an information transmission method according to an embodiment of this application.

FIG. 8 is a schematic flowchart of an information transmission method 400 according to an embodiment of this application. As shown in FIG. 8, the method 400 includes the following steps.

S410: A first network device sends first information to a terminal device, where the first information is used to indicate the terminal device to be handed over from a first cell to a second cell, the first cell is a cell served by a second network device, the second cell is a cell served by a third network device, and the second network device and the third network device are different network devices.

S420: The terminal device sends second information to the first network device, where the second information includes information about a radio link failure that occurs between the terminal device and the second cell. The second information further includes information about a resource, and the information about the resource includes any one or more of information about a beam, information about an uplink carrier, or information about a bandwidth part.

It should be understood that processes of S410 and S420 are the same as processes of S310 and S320 in the foregoing method 300. For brevity, details are not described herein again.

S430: The first network device sends the second information to the third network device, and the third network device receives the second information sent by the first network device.

Specifically, different from that in the method 300, after receiving the second information, the first network device may forward the second information to the third network device, and the third network device determines a cause for the radio link failure.

S440: The third network device determines the cause for the radio link failure.

Optionally, that the third network device determines the cause for the radio link failure includes:

The third network device determines that the radio link failure is caused by an improper configuration of a mobility parameter.

Optionally, the first network device determines one or more of an improper configuration of a cell-specific mobility parameter, an improper configuration of a slice-specific mobility parameter, an improper configuration of a beam-specific mobility parameter, an improper configuration of an uplink-carrier-specific mobility parameter, an improper configuration of a bandwidth-part-specific mobility parameter, or the like.

The method 400 further includes:

S441: The third network device sends sixth information to the first network device, and the first network device receives the sixth information sent by the third network device, where the sixth information is used to indicate a mobility parameter problem.

Optionally, the sixth information includes information used to indicate a granularity of the mobility parameter.

Specifically, the sixth information includes the granularity of the mobility parameter. After receiving the sixth information, the first network device may determine the granularity of the to-be-modified mobility parameter.

Optionally, the granularity of the mobility parameter includes a cell granularity, a slice (slice) granularity, a supplementary uplink carrier (SUL) granularity, a bandwidth part (BWP) granularity, a beam (beam) granularity, or the like.

Specifically, the sixth information includes one or more of a cell-specific mobility parameter modification indication, a slice-specific mobility parameter modification indication, a beam-specific mobility parameter modification indication, an uplink-carrier-specific mobility parameter modification indication, or a bandwidth-part-specific mobility parameter modification indication. After receiving the sixth information, the first network device may determine that the to-be-modified mobility parameter is a cell-specific, a slice-specific, a beam-specific, an uplink-carrier-specific, or a bandwidth-part-specific mobility parameter.

Optionally, the third network device may explicitly indicate the mobility parameter problem, or may implicitly indicate the mobility parameter problem. For details, refer to S331. Details are not described herein again.

Optionally, the sixth information includes a type of a scenario in which the mobility parameter problem is caused, and specifically includes at least one of scenarios such as a premature SN handover, a delayed SN handover, and a ping-pong SN handover.

Optionally, the sixth information further includes at least one of identification information of the terminal device at a source secondary station or in a cell served by a source secondary station, identification information of a secondary station serving a cell in which the terminal device encounters a radio link failure, identification information of a secondary station serving a cell in which the terminal device successfully performs reestablishment, or a radio link failure report.

S442: The first network device sends the sixth information to the second network device, and the second network device receives the sixth information sent by the first network device.

S443: The second network device adjusts the mobility parameter.

It should be understood that a process in which the second network device adjusts the mobility parameter is the same as an adjustment process performed by the second network device in the method 300. For brevity, details are not described herein again.

Optionally, that the second network device adjusts the mobility parameter includes:

The second network device adjusts parameters such as a CIO and/or a TTT and/or a hysteresis. For example, the CIO is a CIO parameter in events A3, A4, and A5, and the hysteresis is a hysteresis parameter in A3, A4, A5, B1, and B2.

Optionally, the second network device adjusts one or more of the cell-specific mobility parameter, the slice-specific mobility parameter, the beam-specific mobility parameter, the uplink-carrier-specific mobility parameter, or the bandwidth-part-specific mobility parameter.

Optionally, that the third network device determines the cause for the radio link failure includes:

The third network device determines that the radio link failure is caused by an improper configuration of the resource.

The method 400 further includes:

S444: The third network device adjusts the configuration of the resource.

Optionally, the resource includes one or more of a beam, an uplink carrier, or a bandwidth part, and that the third network device adjusts the configuration of the resource includes any one or more of the following:

the first network device adjusts a first threshold corresponding to the SSB, that is, adjusts a first threshold corresponding to the SSB in a specific cell;

the first network device adjusts a second threshold corresponding to the CSI-RS, that is, adjusts a second threshold corresponding to the CSI-RS in a specific cell;

the first network device adjusts a third threshold corresponding to the supplementary uplink carrier, that is, adjusts a third threshold corresponding to the supplementary uplink carrier in a specific cell; or the first network device adjusts a RACH resource, that is, adjusts a RACH resource in a specific cell, for example, a time-frequency resource corresponding to each SSB or CSI-RS, or a preamble group included in each SSB or CSI-RS, or properly adjusts parameters such as initial transmit/receive power and a step of a preamble.

It should be understood that a process in which the third network device adjusts the configuration of the resource is the same as an adjustment process performed by the third network device in the method 300. For brevity, details are not described herein again.

Optionally, the method 400 further includes:

The third network device sends fifth information to the first network device, and the first network device receives the fifth information sent by the third network device, where the fifth information is used to indicate an adjusted configuration of the resource.

It should be noted that information exchanged between the first network device and the second network device and information exchanged between the first network device and the third network device each are exchanged by using an interface message between the network devices, such as an existing Xn interface message or EN-DC X2 interface message, or a newly defined Xn interface message or EN-DC X2 interface message. This is not limited in this embodiment of this application.

In this embodiment of this application, after receiving the second information, the first network device forwards the second information to the third network device. If the third network device determines that there is a resource configuration problem, the third network device adjusts the configuration of the resource, for example, adjusts a configuration of a threshold related to a beam or an SUL, for a subsequent cell change configuration. Otherwise, if the third network device determines that there is a mobility parameter problem rather than a resource configuration problem, the third network device indicates the first network device to adjust the mobility parameter, and the first network device indicates the second network device to adjust the mobility parameter. The second network device determines that this scenario is a premature cell change scenario or another newly defined scenario, and then adjusts a related mobility parameter.

Optionally, a protocol layer function of the second network device includes any one or more of a radio link control protocol layer function, a media access control layer function, and a physical layer function; and/or
   a protocol layer function of the third network device includes any one or more of a radio link control protocol layer function, a media access control layer function, and a physical layer function.

Specifically, the method 400 may be further applied to a CU-DU scenario. The second network device may be a DU of a source secondary network device, and the third network device may be a DU of a target secondary network device.

Optionally, a protocol layer function of the first network device includes any one or more of a radio resource control protocol layer function, a service data adaptation layer function, and a packet data convergence protocol layer function.

It should be noted that, in the CU-DU scenario, information exchanged between the first network device and the second network device and information exchanged between the first network device and the third network device each are exchanged by using an interface message between a CU and a DU, such as an existing F1 interface message or a newly defined F1 interface message. This is not limited in this embodiment of this application.

According to the information transmission method in this embodiment of this application, when a terminal device encounters a radio link failure in a multi-connectivity scenario, information reported by the terminal device carries information about a resource. A primary network device may forward the information to a target secondary network device. This helps the primary secondary device accurately perform mobility robustness optimization in a timely manner, thereby helping avoid a secondary node change failure and improving a secondary node change success rate.

Figure 9:
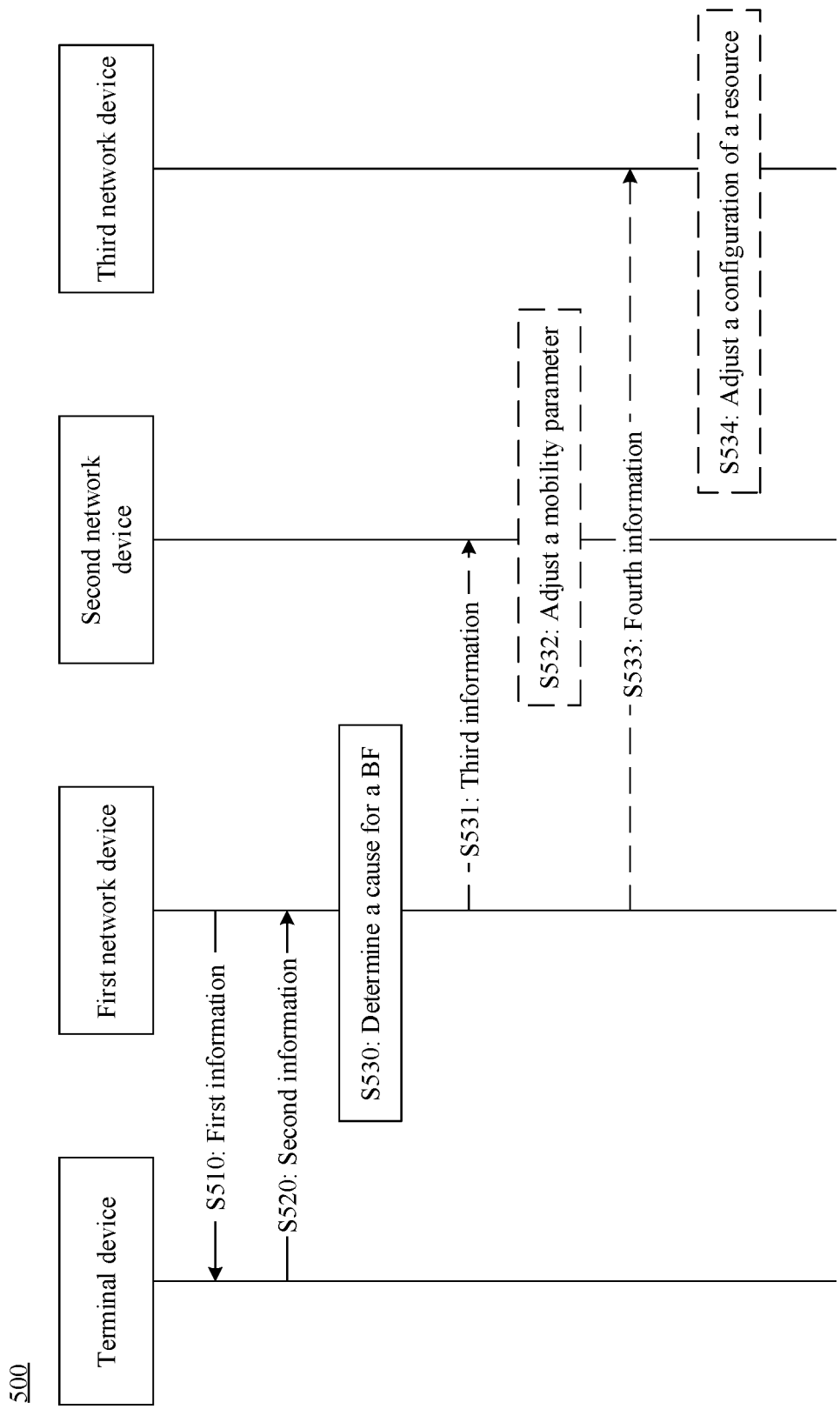
FIG. 9 is another schematic flowchart of an information transmission method according to an embodiment of this application.
Figure 10:
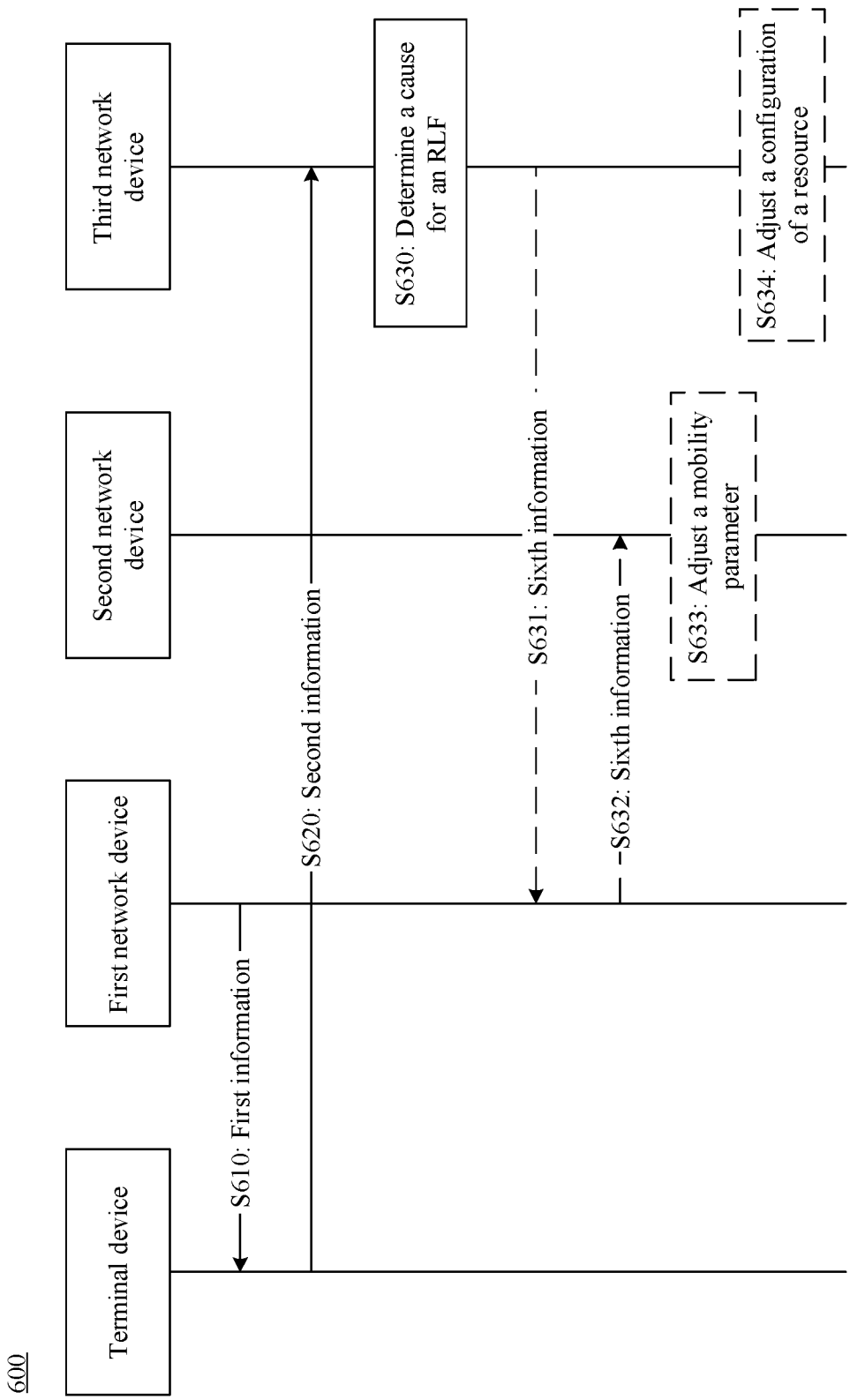
FIG. 10 is another schematic flowchart of an information transmission method according to an embodiment of this application.

The information transmission methods 300 and 400 in the embodiments of this application are described above with reference to FIG. 7 and FIG. 8. In the method 300 and the method 400, processes in which when the terminal device encounters an RLF, the primary network device or the secondary network device determines a cause for the RLF and performs optimization are separately described. With reference to FIG. 9 and FIG. 10, the following describes information transmission methods 500 and 600 in the embodiments of this application. In the method 500 and the method 600, processes in which after a terminal device encounters a BF but succeeds in BFR, a primary network device or a secondary network device determines a cause for the BF are separately described.

FIG. 9 is a schematic flowchart of an information transmission method 500 according to an embodiment of this application. As shown in FIG. 9, the method 500 includes the following steps.

S510: A first network device sends first information to a terminal device, where the first information is used to indicate the terminal device to be handed over from a first cell to a second cell, the first cell is a cell served by a second network device, the second cell is a cell served by a third network device, and the second network device and the third network device are different network devices.

It should be understood that S510 is the same as the process of S310 in the foregoing method 300. For brevity, details are not described herein again.

S520: The terminal device sends second information to the first network device, where the second information includes information about a beam failure and/or beam failure recovery that occurs between the terminal device and the second cell. The second information further includes information about a resource, and the information about the resource includes any one or more of information about a beam, information about an uplink carrier, or information about a bandwidth part.

Optionally, the second information is a BFR report.

It should be understood that the foregoing BFR may be physical uplink control channel-based (physical uplink control channel-based, PUCCH-based) BFR, or may be physical random access channel-based (physical random access channel-based, PRACH-based) BFR. That is, after the beam failure (beam failure), the terminal device may perform the beam failure recovery (beam failure recovery) by using a PUCCH channel or a RACH channel.

Optionally, before the terminal device sends the second information to the first network device, the method further includes:
   The terminal device successfully accesses the second cell served by the third network device.
   The terminal device encounters the beam failure in the second cell, and succeeds in the beam failure recovery.

Optionally, before the terminal device sends the second information to the first network device, the method further includes:
   The terminal device determines that a quantity of BFs is greater than or equal to a first value; and/or
      the terminal device determines that a quantity of BFR times is greater than or equal to a second value; and/or
      the terminal device determines that a timer expires.

The first value, the second value, and the timer may be configured by a network device for the terminal device, specified in a protocol, or determined in another manner. This is not limited in this application.

Specifically, triggering, by the terminal device, reporting of the first information may be triggering by an event, for example, an event when the quantity of BFs or the quantity of BFR times is greater than or equal to a value, or may be triggering by a timer (timer). The first value and the second value in the event triggering and the timer may be configured by the network device (for example, a target network device) for the terminal device.

It should be understood that a description of the second information is the same as the description of the second information in the method 200. For brevity, details are not described herein again.

It should be further understood that the second information may be directly sent by the terminal device to the first network device, for example, may be reported by using an RRC connection between the terminal device and the first network device, may be reported by using another existing message, or may be reported by using a newly defined message. This is not limited in this embodiment of this application.

It should be further understood that the second information may be directly sent by the terminal device to the third network device, for example, reported to the third network device by using a signaling radio bearer SRB3. Optionally, the third network device forwards the second information to the first network device.

S530: The first network device determines a cause for the beam failure.

Optionally, that the first network device determines a cause for the beam failure includes:

The first network device determines that the beam failure is caused by an improper configuration of a mobility parameter.

The method 500 further includes:

S531: The first network device sends third information to the second network device, and the second network device receives the third information sent by the first network device, where the third information is used to indicate a mobility parameter problem.

S532: The second network device adjusts the mobility parameter.

Optionally, that the second network device adjusts the mobility parameter includes:

The second network device adjusts one or more of parameters such as a CIO, a hysteresis, or a TTT.

It should be understood that a process in which the second network device adjusts the mobility parameter is the same as an adjustment process performed by the second network device in the method 300. For brevity, details are not described herein again.

Optionally, that the first network device determines a cause for the beam failure includes:

The first network device determines that the beam failure is caused by an improper configuration of the resource.

The method 500 further includes:

S533: The first network device sends fourth information to the third network device, and the third network device receives the fourth information sent by the first network device, where the fourth information is used to indicate a configuration problem of the resource.

S534: The third network device adjusts the configuration of the resource.

It should be understood that a process in which the third network device adjusts the configuration of the resource is the same as an adjustment process performed by the third network device in the method 300. For brevity, details are not described herein again.

It should be understood that a process in which the first network device performs MRO after determining the cause for the BF and/or the BFR in S531 to S534 is similar to the process in which the first network device performs MRO after determining the cause for the RLF in the method 300. For brevity, details are not described herein again.

In this embodiment of this application, if the first network device determines that there is a resource configuration problem, the first network device adjusts the configuration of the resource, for example, adjust a configuration of a threshold related to a beam or an SUL, for a subsequent handover configuration. Otherwise, the first network device determines that there is no resource configuration problem, and sends an indication to the second network device. After receiving the indication, the second network device determines that this scenario is a premature handover scenario or another newly defined scenario, and then adjusts a related mobility parameter.

Optionally, a protocol layer function of the second network device includes any one or more of a radio link control protocol layer function, a media access control layer function, and a physical layer function; and/or a protocol layer function of the third network device includes any one or more of a radio link control protocol layer function, a media access control layer function, and a physical layer function.

Specifically, the method 300 may be further applied to a CU-DU scenario. The second network device may be a DU of a source secondary network device, and the third network device may be a DU of a target secondary network device.

Optionally, a protocol layer function of the first network device includes any one or more of a radio resource control protocol layer function, a service data adaptation layer function, and a packet data convergence protocol layer function.

It should be noted that, in the CU-DU scenario, information exchanged between the first network device and the second network device and information exchanged between the first network device and the third network device each are exchanged by using an interface message between a CU and a DU, such as an existing F1 interface message or a newly defined F1 interface message. This is not limited in this embodiment of this application.

According to the information transmission method in this embodiment of this application, when a terminal device encounters a beam failure in a multi-connectivity scenario, information reported by the terminal device carries information about a resource. This helps a primary network device accurately perform mobility robustness optimization in a timely manner, thereby helping avoid a secondary node change failure and improving a secondary node change success rate.

FIG. 10 is a schematic flowchart of an information transmission method 600 according to an embodiment of this application. As shown in FIG. 10, the method 600 includes the following steps.

S610: A first network device sends first information to a terminal device, where the first information is used to indicate the terminal device to be handed over from a first cell to a second cell, the first cell is a cell served by a second network device, the second cell is a cell served by a third network device, and the second network device and the third network device are different network devices.

It should be understood that S610 is the same as a process of S310 in the foregoing method 300. For brevity, details are not described herein again.

S620: The terminal device sends second information to the third network device, where the second information includes information about a beam failure that occurs between the terminal device and the second cell. The second information further includes information about a resource, and the information about the resource includes any one or more of information about a beam, information about an uplink carrier, or information about a bandwidth part.

Optionally, that the terminal device sends second information to the third network device includes:

The terminal device sends the second information to the third network device by using a radio bearer SRB3.

Optionally, that the terminal device sends second information to the third network device includes:

The terminal device sends the second information to the first network device, and the first network device receives the second information sent by the terminal device.

The first network device sends the second information to the third network device, and the third network device receives the second information sent by the first network device.

S630: The third network device determines a cause for the beam failure.

Optionally, that the third network device determines a cause for the beam failure includes:

The third network device determines that the beam failure is caused by an improper configuration of a mobility parameter.

The method 600 further includes:

S631: The third network device sends sixth information to the first network device, and the first network device receives the sixth information sent by the third network device, where the sixth information is used to indicate a mobility parameter problem.

S632: The first network device sends the sixth information to the second network device, and the second network device receives the sixth information sent by the first network device.

S633: The second network device adjusts the mobility parameter. Optionally, that the third network device determines a cause for the beam failure includes:

The third network device determines that the beam failure is caused by an improper configuration of the resource.

The method 600 further includes:

S634: The third network device adjusts the configuration of the resource.

It should be understood that a process in which the third network device determines the cause for the BF and performs MRO in S630 to S634 is similar to the process in which the third network device determines the cause for the RLF and performs the MRO in S440 to S444 in the method 400. For brevity, details are not described herein again.

Optionally, a protocol layer function of the second network device includes any one or more of a radio link control protocol layer function, a media access control layer function, and a physical layer function; and/or a protocol layer function of the third network device includes any one or more of a radio link control protocol layer function, a media access control layer function, and a physical layer function.

Specifically, the method 300 may be further applied to a CU-DU scenario. The second network device may be a DU of a source secondary network device, and the third network device may be a DU of a target secondary network device.

Optionally, a protocol layer function of the first network device includes any one or more of a radio resource control protocol layer function, a service data adaptation layer function, and a packet data convergence protocol layer function.

It should be noted that, in the CU-DU scenario, information exchanged between the first network device and the second network device and information exchanged between the first network device and the third network device each are exchanged by using an interface message between a CU and a DU, such as an existing F1 interface message or a newly defined F1 interface message. This is not limited in this embodiment of this application.

According to the information transmission method in this embodiment of this application, when a terminal device encounters a beam failure in a multi-connectivity scenario, information reported by the terminal device carries information about a resource. This helps a target secondary network device accurately perform mobility robustness optimization in a timely manner, thereby helping avoid a secondary node change failure and improving a secondary node change success rate.

The foregoing describes in detail the method 300 to the method 600 in the embodiments of this application with reference to FIG. 7 to FIG. 10. In the method 300 to the method 600, after the terminal device receives a cell change message, if an RLF occurs in a process in which the terminal device is handed over to a cell of the target secondary network device or a BF occurs after the terminal device is handed over to a cell of the target secondary network device, the terminal device may report the second information, and the primary network device or the target secondary network device may determine the cause for the RLF or the BF, and perform corresponding MRO. The following describes information transmission methods 700 and 800 according to the embodiments of this application with reference to FIG. 11 and FIG. 12. In the method 700 and the method 800, a process in which before a terminal device receives a cell change message, the terminal device encounters an RLF on a source secondary network device and the network device performs MRO is described.

Figure 11:
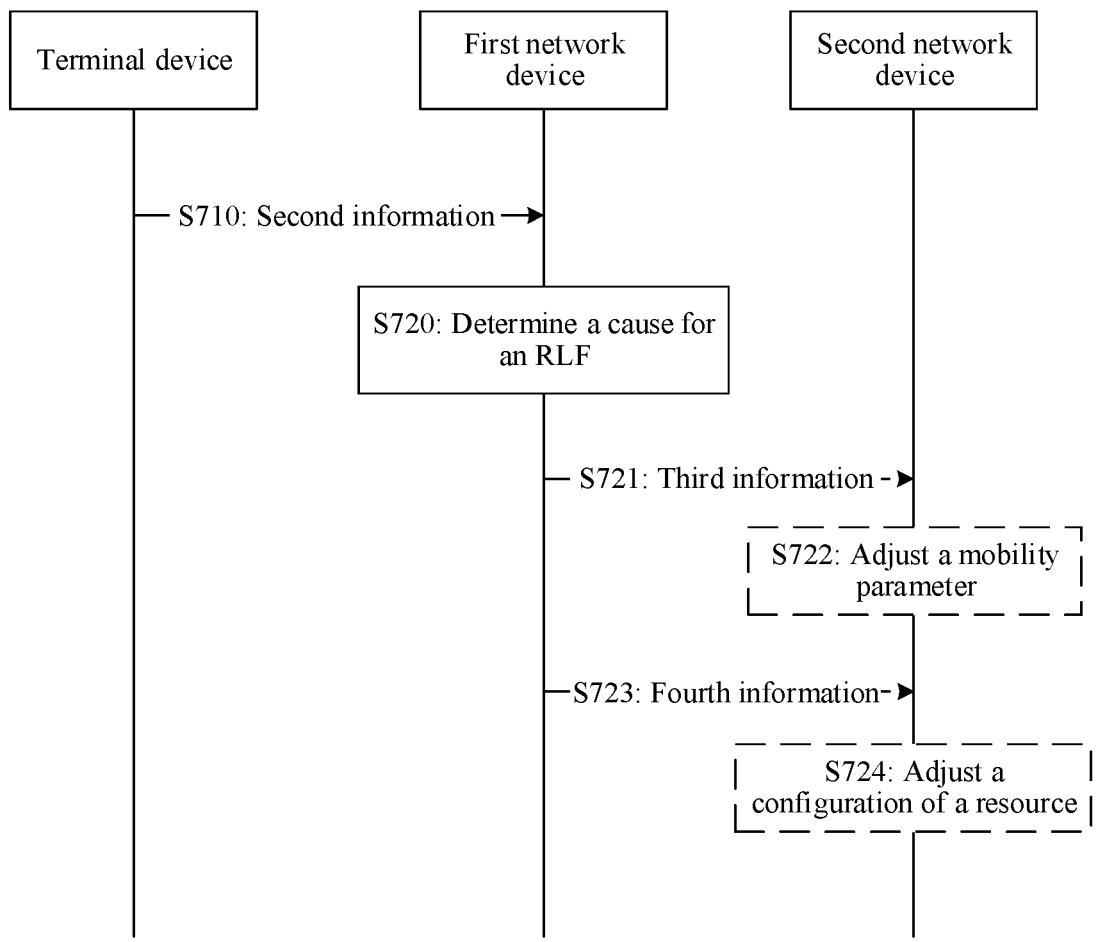
FIG. 11 is another schematic flowchart of an information transmission method according to an embodiment of this application.

FIG. 11 is a schematic flowchart of an information transmission method 700 according to an embodiment of this application. As shown in FIG. 11, the method 700 includes the following steps.

S710: A terminal device sends second information to a first network device, where the second information includes information about a radio link failure that occurs between the terminal device and a first cell, and the first cell is a cell of a second network device. The second information further includes information about a resource, and the information about the resource includes any one or more of information about a beam, information about an uplink carrier, or information about a bandwidth part.

Optionally, the second information is SCGfailureinfo.

Optionally, before the terminal device sends the second information to the first network device, the method 700 further includes:

The terminal device encounters the radio link failure in the first cell.

Optionally, the first network device may be a primary network device, or may be the RAN 111 shown in FIG. 3. The second network device is a secondary network device, or may be the RAN 112 shown in FIG. 3.

Optionally, the primary network device has triggered a secondary network device change before receiving the second information, or triggers a secondary network device change only after receiving the second information. This is not limited in this embodiment of this application.

Optionally, the secondary network device may have triggered a secondary network device change before the primary network device receives the second information, or triggers a secondary network device change only after the primary network device receives the second information. This is not limited in this embodiment of this application.

For example, as shown in FIG. 3, before the RAN 112 triggers the change, the terminal device 131 encounters a radio link failure on the RAN 112, and then the terminal device reports SCGfailureinfo of the RAN 112 to the RAN 111. Then, within a very short period of time (for example, a timer is set), the RAN 111 adds the RAN 113 as a secondary node. In this case, that the RAN 111 adds the RAN 113 may be triggered by the RAN 112, or may be triggered by the RAN 111.

S720: The first network device determines a cause for the radio link failure.

Optionally, that the first network device determines a cause for the radio link failure includes:

The first network device determines that the radio link failure is caused by an improper configuration of a mobility parameter.

The method 700 further includes:

S721: The first network device sends third information to the second network device, and the second network device receives the third information sent by the first network device, where the third information is used to indicate a mobility parameter problem.

S722: The second network device adjusts the mobility parameter.

It should be understood that S721 and S722 are the same as processes of S331 and S332 in the foregoing method 300. For brevity, details are not described herein again.

Optionally, that the first network device determines a cause for the radio link failure includes:

The first network device determines that the radio link failure is caused by an improper configuration of the resource.

The method 700 further includes:

S723: The first network device sends fourth information to the second network device, and the second network device receives the fourth information sent by the first network device, where the fourth information is used to indicate a configuration problem of the resource.

S724: The second network device adjusts a configuration of the resource.

It should be understood that a process in which the second network device adjusts the configuration of the resource is similar to the process in which the third network device adjusts the configuration of the resource in S333 and S334. For brevity, details are not described herein again.

Figure 12:
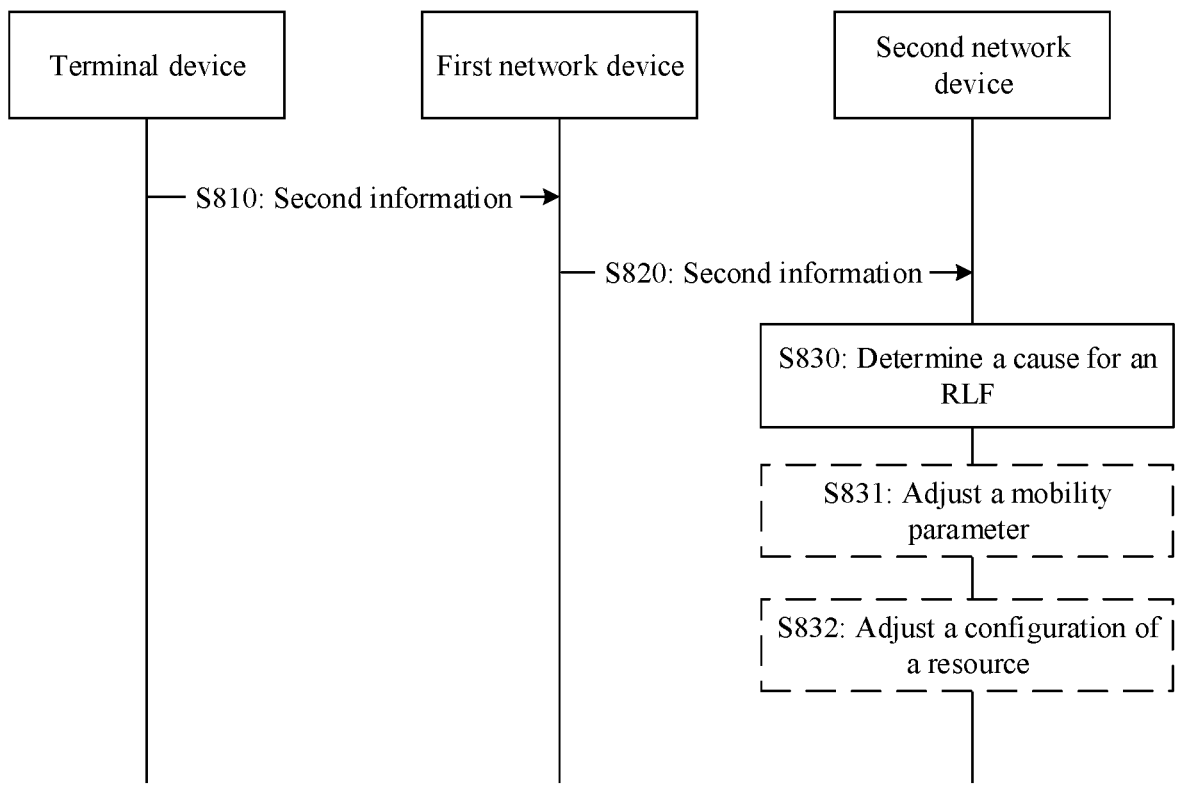
FIG. 12 is another schematic flowchart of an information transmission method according to an embodiment of this application.

FIG. 12 is a schematic flowchart of an information transmission method 800 according to an embodiment of this application. As shown in FIG. 12, the method 800 includes the following steps.

S810: A terminal device sends second information to a first network device, where the second information includes information about a radio link failure that occurs between the terminal device and a first cell, and the first cell is a cell of a second network device. The second information further includes information about a resource, and the information about the resource includes any one or more of information about a beam, information about an uplink carrier, or information about a bandwidth part.

It should be understood that S810 is the same as S710 in the foregoing method 700. For brevity, details are not described herein again.

S820: The first network device forwards the second information to the second network device.

Specifically, the first network device may forward, to the second network device, the second information sent by the terminal device, and the second network device determines a cause for the radio link failure.

S830: The second network device determines the cause for the radio link failure.

Optionally, that the second network device determines the cause for the radio link failure includes:

The first network device determines that the radio link failure is caused by an improper configuration of a mobility parameter.

The method 800 further includes:

S831: The second network device adjusts the mobility parameter.

It should be understood that a process in which the second network device adjusts the mobility parameter is the same as an adjustment process performed by the second network device in the method 300. For brevity, details are not described herein again.

Optionally, that the second network device adjusts the mobility parameter includes:

The second network device adjusts one or more of parameters such as a CIO, a hysteresis, or a TTT.

Optionally, the method 800 further includes:

The second network device sends a modified mobility parameter to the first network device; and The first network device sends the modified mobility parameter to the terminal device.

Optionally, that the second network device determines a cause for the radio link failure includes:

The second network device determines that the radio link failure is caused by an improper configuration of the resource.

The method 800 further includes:

S832: The second network device adjusts a configuration of the resource.

It should be understood that a process in which the second network device adjusts the configuration of the resource is similar to the process in which the third network device adjusts the configuration of the resource in the method 300. For brevity, details are not described herein again.

According to the information transmission method in this embodiment of this application, when a terminal device encounters a radio link failure in a multi-connectivity scenario, information reported by the terminal device carries information about a resource. This helps a secondary network device accurately perform mobility robustness optimization in a timely manner, thereby helping avoid a secondary node change failure and improving a secondary node change success rate.

With reference to the method 700 and the method 800, the foregoing describes a process in which the network device performs MRO when the terminal device encounters the RLF on the source secondary network device before receiving the cell change message. The following describes a method 900 and a method 1000 in the embodiments of this application with reference to FIG. 13 and FIG. 14. In the method 900 and the method 1000, a process in which a network device performs MRO when a terminal device encounters a BF on a source secondary network device before receiving a cell change message is described.

Figure 13:
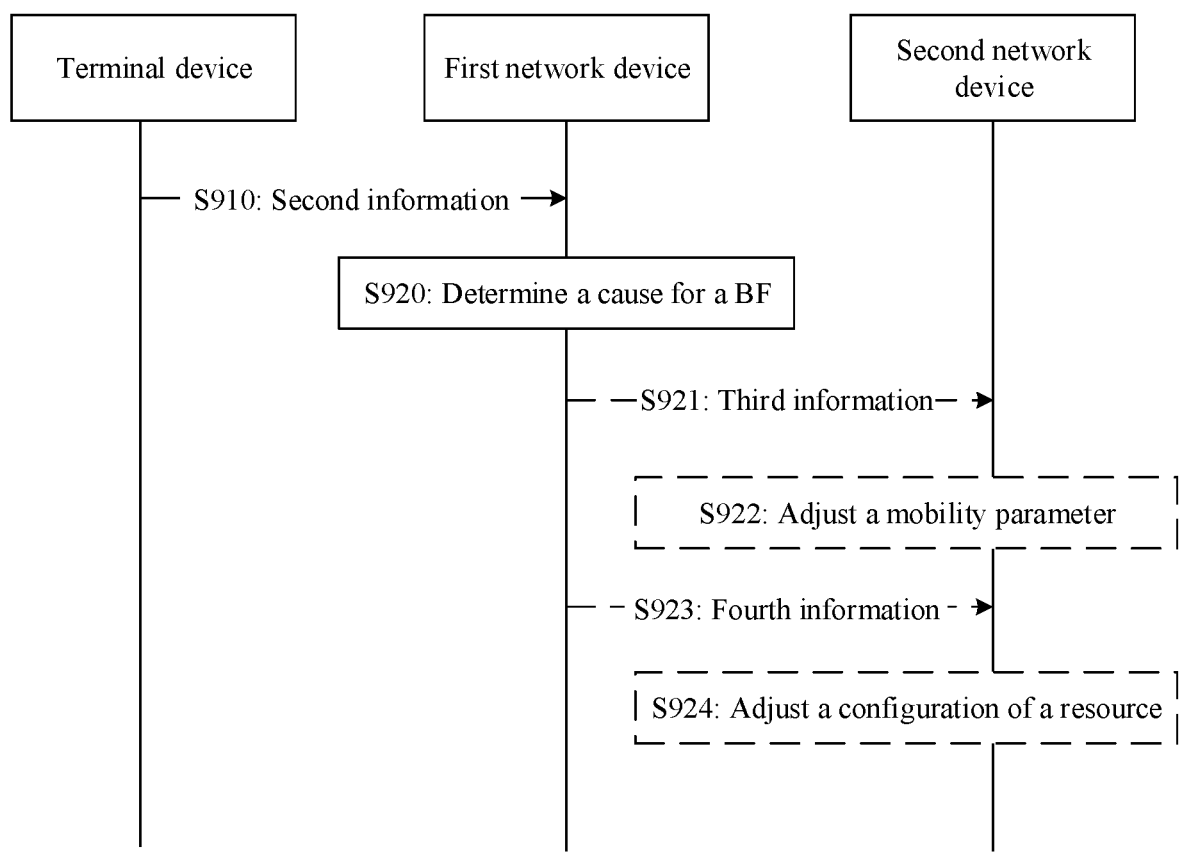
FIG. 13 is another schematic flowchart of an information transmission method according to an embodiment of this application.

FIG. 13 is a schematic flowchart of an information transmission method 900 according to an embodiment of this application. As shown in FIG. 13, the method 900 includes the following steps.

S910: A terminal device sends second information to a second network device, where the second information includes information about beam failure recovery that occurs between the terminal device and a first cell, and the first cell is a cell of a second network device. The second information further includes information about a resource, and the information about the resource includes any one or more of information about a beam, information about an uplink carrier, or information about a bandwidth part.

Optionally, the second information is a BFR report.

Optionally, before the terminal device sends the second information to the first network device, the method 900 further includes:

The terminal device encounters a beam failure in the first cell, and succeeds in the beam failure recovery.

Optionally, the first network device may be a primary network device, or may be the RAN 111 shown in FIG. 3. The second network device is a secondary network device, or may be the RAN 112 shown in FIG. 3.

Optionally, the primary network device has triggered a secondary network device change before receiving the second information, or triggers a secondary network device change only after receiving the second information. This is not limited in this embodiment of this application.

Optionally, the secondary network device may have triggered a secondary network device change before the primary network device receives the second information, or triggers a secondary network device change only after the primary network device receives the second information. This is not limited in this embodiment of this application.

For example, as shown in FIG. 3, before the RAN 112 triggers the change, the terminal device 131 encounters a beam failure on the RAN 112 and succeeds in beam failure recovery, and then the terminal device reports a BFR report of the RAN 112 to the RAN 111. Then, within a very short period of time (for example, a timer is set), the RAN 111 adds the RAN 113 as a secondary node. In this case, that the RAN 111 adds the RAN 113 may be triggered by the RAN 112, or may be triggered by the RAN 111.

S920: The first network device determines a cause for the beam failure.

Optionally, that the first network device determines a cause for the beam failure includes:

The first network device determines that the beam failure is caused by an improper configuration of a mobility parameter.

The method 900 further includes:

S921: The first network device sends third information to the second network device, and the second network device receives the third information sent by the first network device, where the third information is used to indicate a mobility parameter problem.

S922: The second network device adjusts the mobility parameter.

It should be understood that S921 and S922 are similar to a process in which the first network device performs MRO after determining the cause for the RLF in the foregoing method 300. For brevity, details are not described herein again.

Optionally, that the first network device determines a cause for the beam failure includes:

The first network device determines that the beam failure is caused by an improper configuration of the resource.

The method 900 further includes:

S923: The first network device sends fourth information to the second network device, and the second network device receives the fourth information sent by the first network device, where the fourth information is used to indicate a configuration problem of the resource.

S924: The second network device adjusts a configuration of the resource.

It should be understood that a process in which the second network device adjusts the configuration of the resource is similar to the process in which the third network device adjusts the configuration of the resource in S333 and S334. For brevity, details are not described herein again.

Figure 14:
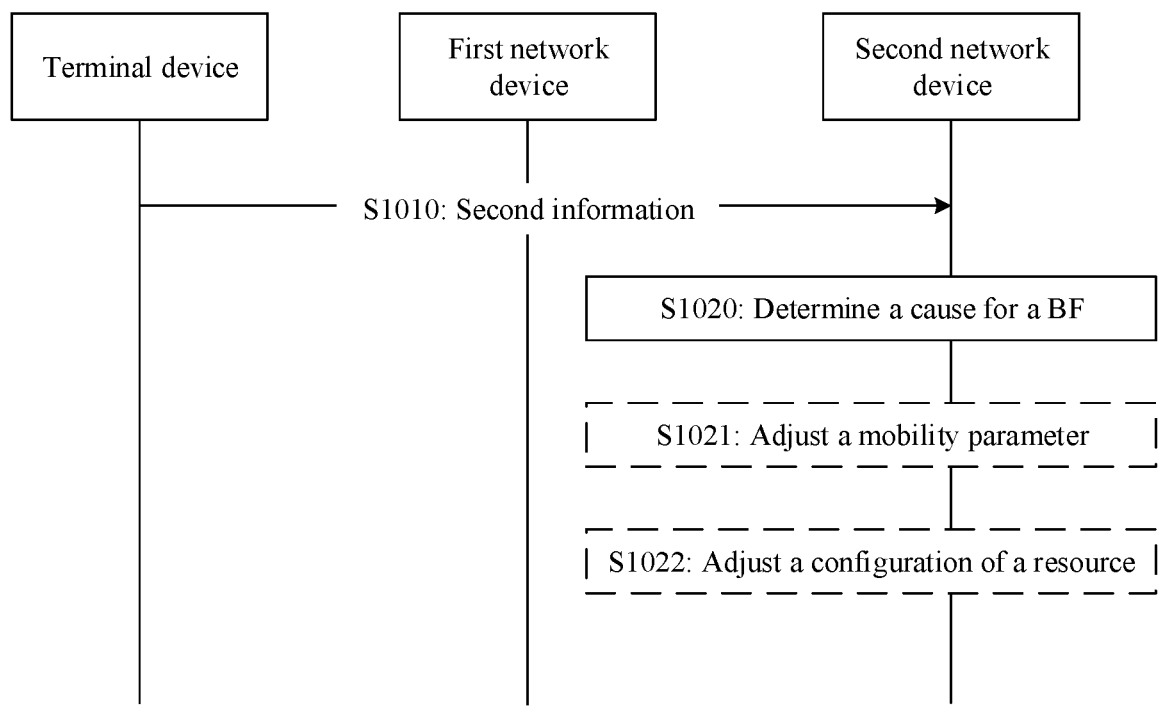
FIG. 14 is another schematic flowchart of an information transmission method according to an embodiment of this application.

FIG. 14 is a schematic flowchart of an information transmission method 1000 according to an embodiment of this application. As shown in FIG. 14, the method 1000 includes the following steps.

S1010: A terminal device sends second information to a second network device, where the second information includes information about beam failure recovery that occurs between the terminal device and a first cell, and the first cell is a cell of a second network device. The second information further includes information about a resource, and the information about the resource includes any one or more of information about a beam, information about an uplink carrier, or information about a bandwidth part.

Optionally, that a terminal device sends second information to a second network device includes:

The terminal device sends the second information to the second network device by using a signaling radio bearer SRB3.

Optionally, that a terminal device sends second information to a second network device includes:

The terminal device sends the second information to a first network device.

The first network device forwards the second information to the second network device.

S1020: The second network device determines a cause for a beam failure.

Optionally, that the second network device determines a cause for a beam failure includes:

The second network device determines that the beam failure is caused by an improper configuration of a mobility parameter.

The method 1000 further includes:

S1021: The second network device adjusts the mobility parameter.

Optionally, that the second network device adjusts the mobility parameter includes:

The second network device adjusts parameters such as a CIO and/or a TTT, where the parameters such as the CIO and/or the TTT are parameters in an A3 event or an A5 event.

It should be understood that a process in which the second network device adjusts the mobility parameter is the same as an adjustment process performed by the second network device in the method 300. For brevity, details are not described herein again.

Optionally, the method 1000 further includes:

The second network device sends a modified mobility parameter to the first network device; and The first network device sends the modified mobility parameter to the terminal device.

Optionally, that the second network device determines the cause for the beam failure includes:

The second network device determines that the beam failure is caused by an improper configuration of the resource.

The method 1000 further includes:

S1022: The second network device adjusts a configuration of the resource.

It should be understood that a process in which the second network device adjusts the configuration of the resource is similar to the process in which the third network device adjusts the configuration of the resource in the method 300. For brevity, details are not described herein again.

According to the information transmission method in this embodiment of this application, when a terminal device encounters a beam failure in a multi-connectivity scenario, information reported by the terminal device carries information about a resource. This helps a secondary network device accurately perform mobility robustness optimization in a timely manner, thereby helping avoid a secondary node change failure and improving a secondary node change success rate.

With reference to FIG. 7 to FIG. 14, the foregoing describes several premature or delayed secondary node change scenarios. With reference to FIG. 15 to FIG. 18, the following describes several scenarios of premature secondary node addition in the embodiments of this application.

Figure 15:
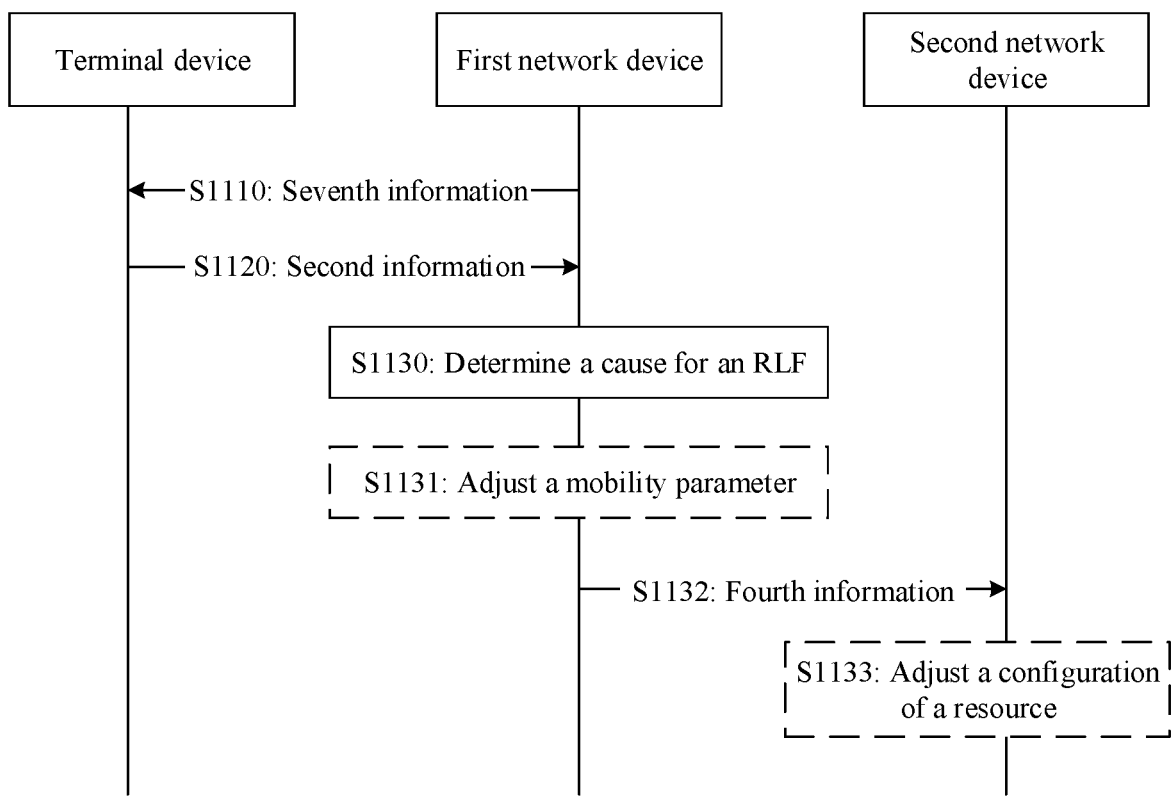
FIG. 15 is another schematic flowchart of an information transmission method according to an embodiment of this application.

FIG. 15 is a schematic flowchart of an information transmission method 1100 according to an embodiment of this application. As shown in FIG. 15, the method 1100 includes the following steps.

S1110: A first network device sends seventh information to a terminal device, and the terminal device receives the seventh information sent by the network device, where the seventh information is used to indicate that the first network device adds a second network device as a secondary network device.

Optionally, the first network device is a primary network device.

S1120: The terminal device sends second information to the first network device, where the second information includes information about a radio link failure that occurs between the terminal device and a second cell. The second information further includes information about a resource, and the information about the resource includes any one or more of information about a beam, information about an uplink carrier, or information about a bandwidth part.

Optionally, the second information is SCGfailureinfo.

It should be understood that content of the second information is the same as that described in the method 200. For brevity, details are not described herein again.

Optionally, before the terminal device sends the second information to the first network device, the method further includes:

The terminal device initiates random access to the second network device, and fails in the random access.

Optionally, before the terminal device sends the second information to the first network device, the method further includes:

The terminal device initiates random access to the second network device, and succeeds in the random access.

The terminal device encounters a radio link failure in the second cell.

S1130: The first network device determines a cause for the radio link failure.

Optionally, that the first network device determines a cause for the radio link failure includes:

The first network device determines that the radio link failure is caused by an improper configuration of a mobility parameter.

Optionally, the method 1100 further includes:

S1131: The first network device adjusts the mobility parameter.

It should be understood that a process in which the first network device adjusts the mobility parameter is similar to the process in which the second network device adjusts the mobility parameter in the method 300. For brevity, details are not described herein again.

Optionally, that the first network device determines a cause for the radio link failure includes:

The first network device determines that the radio link failure is caused by an improper configuration of the resource.

Optionally, the method 1100 further includes:

S1132: The first network device sends fourth information to the second network device, where the fourth information is used to indicate a configuration problem of the resource.

S1133: The second network device adjusts the configuration of the resource.

It should be understood that, processes of S1132 and S1133 are similar to the processes of S333 and S334 in the foregoing method 300. For brevity, details are not described herein again.

In this embodiment of this application, the first network device may determine the radio link failure problem based on the second information. For example, the first network device determines whether the radio link failure is caused by premature secondary node addition or a configuration problem of a secondary node, and the configuration problem is, for example, a resource configuration (a RACH resource configuration, a beam configuration, an SUL/UL configuration, or a BWP configuration). If the radio link failure is caused by a resource configuration, the first network device sends a problem indication to the second network device, where the problem indication may be an RACH resource configuration problem indication, a beam problem indication, an SUL/UL configuration problem indication, or the like, so that the second network device modifies a configuration. Otherwise, if the radio link failure is caused by premature secondary node addition, the first network device directly optimizes a downlink mobility parameter.

According to the information transmission method in this embodiment of this application, when a terminal device encounters a radio link failure in a multi-connectivity scenario, information reported by the terminal device carries information about a resource. This helps a primary network device accurately perform mobility robustness optimization in a timely manner, thereby helping avoid a secondary node change failure and improving a secondary node change success rate.

Figure 16:
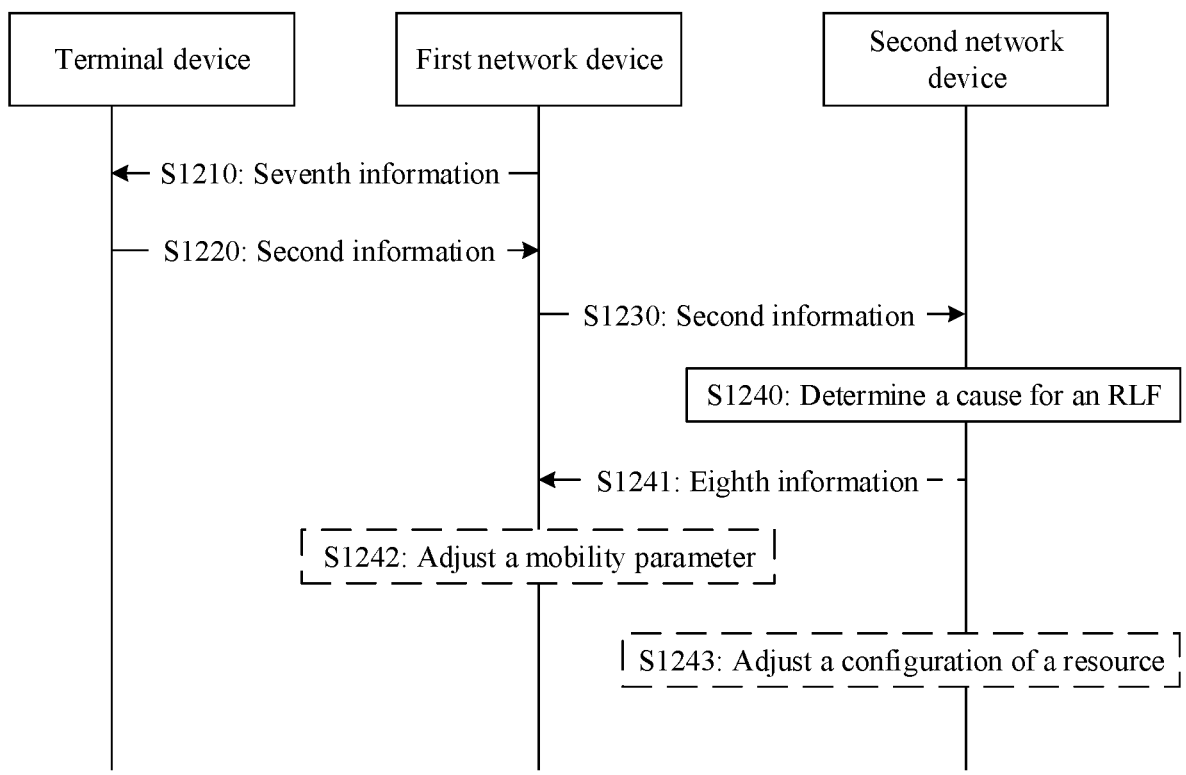
FIG. 16 is another schematic flowchart of an information transmission method according to an embodiment of this application.

FIG. 16 is a schematic flowchart of an information transmission method 1200 according to an embodiment of this application. As shown in FIG. 16, the method 1200 includes the following steps.

S1210: A first network device sends seventh information to a terminal device, and the terminal device receives the seventh information sent by the network device, where the seventh information is used to indicate that the first network device adds a second network device as a secondary network device.

S1220: The terminal device sends second information to the first network device, where the second information includes information about a radio link failure that occurs between the terminal device and a second cell. The second information further includes information about a resource, and the information about the resource includes any one or more of information about a beam, information about an uplink carrier, or information about a bandwidth part.

S1230: The first network device forwards the second information to the second network device.

Optionally, the second information may be sent to the second network device by using a new message (for example, an SCGfailureindication message) or an existing message.

Optionally, the existing message includes but is not limited to the following messages: a secondary node addition request/response message (SN addition request/response), a secondary node modification request/response/acknowledgement message (SN modification request/response/acknowledgement), or a secondary node release request/response message (SN release request/response).

S1240: The second network device determines a cause for the radio link failure.

Optionally, that the second network device determines a cause for the radio link failure includes:

The second network device determines that the radio link failure is caused by an improper configuration of a mobility parameter.

Optionally, the second network device determines one or more of an improper configuration of a cell-specific mobility parameter, an improper configuration of a slice-specific mobility parameter, an improper configuration of a beam-specific mobility parameter, an improper configuration of an uplink-carrier-specific mobility parameter, an improper configuration of a bandwidth-part-specific mobility parameter, or the like.

The method 1200 further includes:

S1241: The second network device sends eighth information to the first network device, where the eighth information is the used to indicate a mobility parameter problem.

Optionally, the eighth information includes information used to indicate a granularity of the mobility parameter.

Specifically, the eighth information includes the granularity of the mobility parameter. After receiving the eighth information, the first network device may determine the granularity of the to-be-modified mobility parameter.

Optionally, the granularity of the mobility parameter includes a cell granularity, a slice (slice) granularity, a supplementary uplink carrier (SUL) granularity, a bandwidth part (BWP) granularity, a beam (beam) granularity, or the like.

Specifically, the eighth information includes one or more of a cell-specific mobility parameter modification indication, a slice-specific mobility parameter modification indication, a beam-specific mobility parameter modification indication, an uplink-carrier-specific mobility parameter modification indication, or a bandwidth-part-specific mobility parameter modification indication. After receiving the eighth information, the first network device may determine that the to-be-modified mobility parameter is a cell-specific, a slice-specific, a beam-specific, an uplink-carrier-specific, or a bandwidth-part-specific mobility parameter.

Optionally, the second network device may explicitly indicate to adjust the mobility parameter, or may implicitly indicate to adjust the mobility parameter.

Optionally, the eighth information may not carry the information used to indicate the granularity of the mobility parameter. After receiving the eighth information, the first network device may independently determine the granularity of the to-be-modified mobility parameter.

Optionally, the eighth information includes a specific mobility parameter problem, specifically including at least one of a premature SN addition scenario, a delayed SN addition scenario, a ping-pong SN addition scenario, and the like.

Optionally, the eighth information further includes at least one of identification information of the terminal device in a cell served by a source secondary station, identification information of a secondary station serving a cell in which the terminal device encounters a radio link failure, or identification information of a secondary station serving a cell in which the terminal device successfully performs reestablishment.

Specifically, this may be consistent with the description in S331, and details are not described herein again.

S1242: The first network device adjusts the mobility parameter.

The first network device adjusts one or more of parameters such as a CIO, a TTT, and a hysteresis. For example, the CIO is a CIO parameter in events A3, A4, and A5, and the hysteresis is a hysteresis parameter in A3, A4, A5, B1, and B2.

Optionally, the first network device adjusts one or more of the cell-specific mobility parameter, the slice-specific mobility parameter, the beam-specific mobility parameter, the uplink-carrier-specific mobility parameter, or the bandwidth-part-specific mobility parameter.

It should be understood that a process in which the first network device adjusts the mobility parameter is similar an adjustment process performed by the second network device in the method 300. For brevity, details are not described herein again.

Optionally, that the second network device determines a cause for the radio link failure includes:

The second network device determines that the radio link failure is caused by an improper configuration of the resource.

Optionally, the method 1200 further includes:

S1243: The second network device adjusts a configuration of the resource.

It should be understood that a process in which the second network device adjusts the configuration of the resource in S1243 is the same as the process in which the third network device adjusts the configuration of the resource in the method 300. For brevity, details are not described herein again.

In this embodiment of this application, if the second network device determines a problem such as a resource configuration problem (a RACH resource configuration, a beam configuration, an SUL/UL configuration, or the like, where if the problem is a configuration problem of an SN), the second network device directly modifies the configuration. Optionally, the SN may send a configuration modification complete message to an MN. Otherwise, if the problem is not a resource configuration problem, the second network device sends eighth information (for example, an SN addition report) to the first network device, where the report indicates premature secondary node addition, and the SN addition report is sent through a new message or an existing message.

Figure 17:
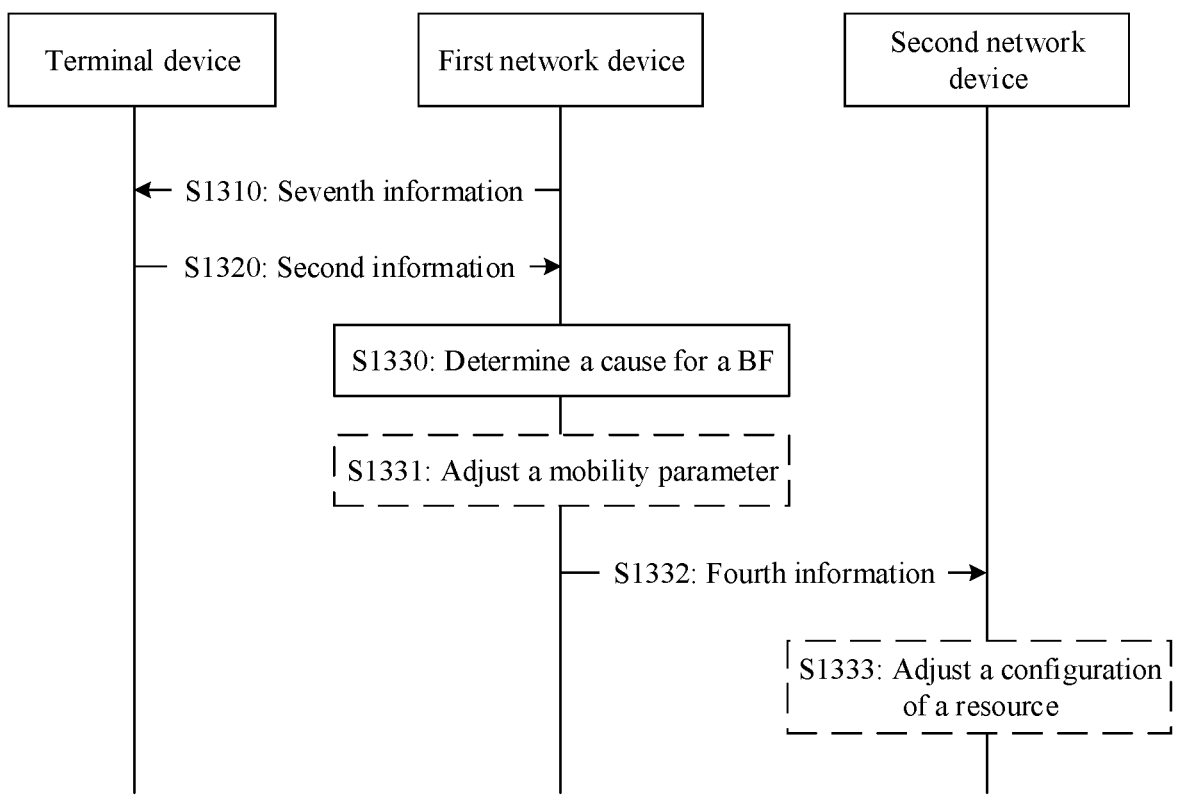
FIG. 17 is another schematic flowchart of an information transmission method according to an embodiment of this application.

FIG. 17 is a schematic flowchart of an information transmission method 1300 according to an embodiment of this application. As shown in FIG. 17, the method 1300 includes the following steps.

S1310: A first network device sends seventh information to a terminal device, and the terminal device receives the seventh information sent by the network device, where the seventh information is used to indicate that the first network device adds a second network device as a secondary network device.

Optionally, the first network device is a primary network device.

S1320: The terminal device sends second information to the first network device, where the second information includes information about beam failure recovery that occurs between the terminal device and the second cell. The second information further includes information about a resource, and the information about the resource includes any one or more of information about a beam, information about an uplink carrier, or information about a bandwidth part.

Optionally, the second information is a BFR report.

It should be understood that content of the second information is the same as that described in the method 200. For brevity, details are not described herein again.

Optionally, before the terminal device sends the second information to the first network device, the method further includes:

The terminal device initiates random access to a first cell served by the second network device, and succeeds in the random access.

The terminal device encounters a beam failure occurs in the first cell of the second network device, and succeeds in beam failure recovery.

Optionally, before the terminal device sends the second information to the first network device, the method further includes:

The terminal device determines that a quantity of BFs is greater than or equal to a first value; and/or the terminal device determines that a quantity of BFR times is greater than or equal to a second value; and/or the terminal device determines that a timer expires.

The first value, the second value, and the timer may be configured by a network device for the terminal device, specified in a protocol, or determined in another manner. This is not limited in this application.

Specifically, triggering, by the terminal device, reporting of the first information may be triggering by an event, for example, an event when the quantity of BFs or the quantity of BFR times is greater than or equal to a value, or may be triggering by a timer (timer). The first value and the second value in the event triggering and the timer may be configured by the network device (for example, a target network device) for the terminal device.

It should be further understood that the BFR report may be reported through an RRC connection between the terminal device and the first network device, or may be reported through another existing message, or may be reported through a newly defined message. This is not limited in this embodiment of this application.

It should be further understood that the second information may be forwarded by the second network device to the first network device after the terminal device reports the second information to the second network device by using a signaling radio bearer SRB3.

S1330: The first network device determines a cause for the beam failure.

Optionally, that the first network device determines a cause for the beam failure includes:

The first network device determines that the beam failure is caused by an improper configuration of a mobility parameter.

The method 1300 further includes:

S1331: The first network device adjusts the mobility parameter.

It should be understood that a process in which the first network device adjusts the mobility parameter is the same as an adjustment process performed by the second network device in the method 300. For brevity, details are not described herein again.

Optionally, that the first network device determines a cause for the beam failure includes:

The first network device determines that the beam failure is caused by an improper configuration of the resource.

The method 1300 further includes:

S1332: The first network device sends fourth information to the second network device, where the fourth information is used to indicate a configuration problem of the resource.

S1333: The second network device adjusts a configuration of the resource.

It should be understood that a process in which the second network device adjusts the configuration of the resource is the same as an adjustment process performed by the third network device in the method 300. For brevity, details are not described herein again.

In this embodiment of this application, the first network device may determine the beam failure problem based on the second information. For example, the first network device determines whether the radio link failure is caused by premature secondary node addition or a configuration problem of a secondary node, and the configuration problem is, for example, a resource configuration (a RACH resource configuration, a beam configuration, an SUL/UL configuration, or a BWP configuration). If the radio link failure is caused by a resource configuration problem, the first network device sends a problem indication to the second network device, where the problem indication may be an RACH resource configuration problem indication, a beam problem indication, an SUL/UL configuration problem indication, or the like, so that the second network device modifies a configuration. Otherwise, if the radio link failure is caused by premature secondary node addition, the first network device directly optimizes a downlink mobility parameter.

According to the information transmission method in this embodiment of this application, when a terminal device encounters a beam failure in a multi-connectivity scenario, information reported by the terminal device carries information about a resource. This helps a primary network device accurately perform mobility robustness optimization in a timely manner, thereby helping avoid a secondary node change failure and improving a secondary node change success rate.

Figure 18:
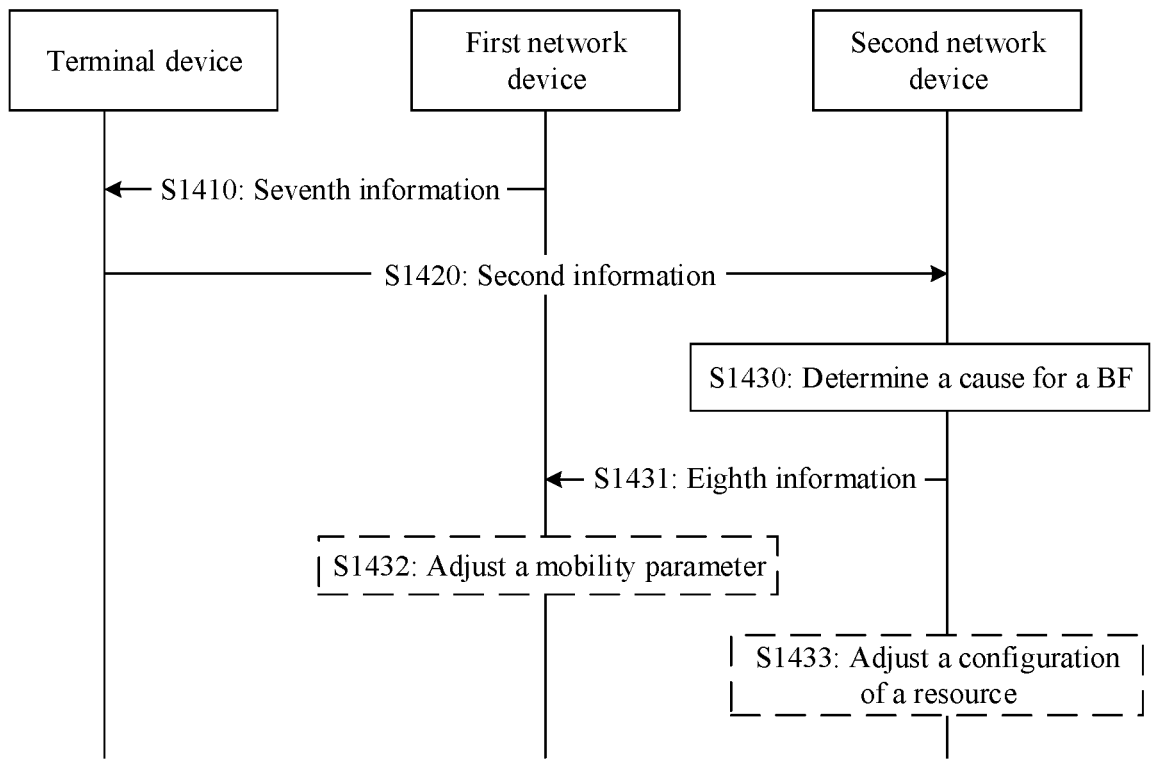
FIG. 18 is another schematic flowchart of an information transmission method according to an embodiment of this application.

FIG. 18 is a schematic flowchart of an information transmission method 1400 according to an embodiment of this application. As shown in FIG. 18, the method 1400 includes the following steps.

S1410: A first network device sends seventh information to a terminal device, and the terminal device receives the seventh information sent by the network device, where the seventh information is used to indicate that the first network device adds a second network device as a secondary network device.

S1420: The terminal device sends second information to the second network device, where the second information includes information about beam failure recovery that occurs between the terminal device and the second cell. The second information further includes information about a resource, and the information about the resource includes any one or more of information about a beam, information about an uplink carrier, or information about a bandwidth part.

S1430: The second network device determines a cause for a beam failure.

Optionally, that the second network device determines a cause for a beam failure includes:

The second network device determines that the beam failure is caused by an improper configuration of a mobility parameter.

The method 1400 further includes:

S1431: The second network device sends eighth information to the first network device, and the first network device receives the eighth information sent by the second network device, where the eighth information is used to indicate a mobility parameter problem.

S1432: The first network device adjusts the mobility parameter.

It should be understood that a process in which the first network device adjusts the mobility parameter is the same as an adjustment process performed by the second network device in the method 300. For brevity, details are not described herein again.

Optionally, that the second network device determines the cause for the beam failure includes:

The second network device determines that the beam failure is caused by an improper configuration of the resource.

The method 1400 further includes:

S1433: The second network device adjusts a configuration of the resource.

It should be understood that a process in which the second network device adjusts the configuration of the resource is the same as an adjustment process performed by the third network device in the method 300. For brevity, details are not described herein again.

In this embodiment of this application, the second network device may determine the beam failure problem based on the second information. For example, the first network device determines whether the radio link failure is caused by premature secondary node addition or a configuration problem of a secondary node, and the configuration problem is, for example, a resource configuration (a RACH resource configuration, a beam configuration, an SUL/UL configuration, or a BWP configuration). If the radio link failure is caused by a resource configuration problem, the second network device adjusts the configuration of the resource. Otherwise, if the radio link failure is caused by premature secondary node addition, the second network device sends indication information to the first network device to indicate the first network device to optimize a downlink mobility parameter.

According to the information transmission method in this embodiment of this application, when a terminal device encounters a beam failure in a multi-connectivity scenario, information reported by the terminal device carries information about a resource. This helps a secondary network device accurately perform mobility robustness optimization in a timely manner, thereby helping avoid a secondary node change failure and improving a secondary node change success rate.

The foregoing describes in detail the information transmission method provided in the embodiments of this application with reference to FIG. 6 to FIG. 18. The following describes in detail an information transmission apparatus, a network device, and a terminal device that are provided in the embodiments of this application with reference to the accompanying drawings.

An embodiment of this application further provides an apparatus configured to implement any one of the foregoing methods. For example, an apparatus is provided, including units (or means) configured to implement the steps performed by the network device in any one of the foregoing methods. For another example, another apparatus is further provided, including units (or means) configured to implement the steps performed by the terminal device in any one of the foregoing methods.

Figure 19:
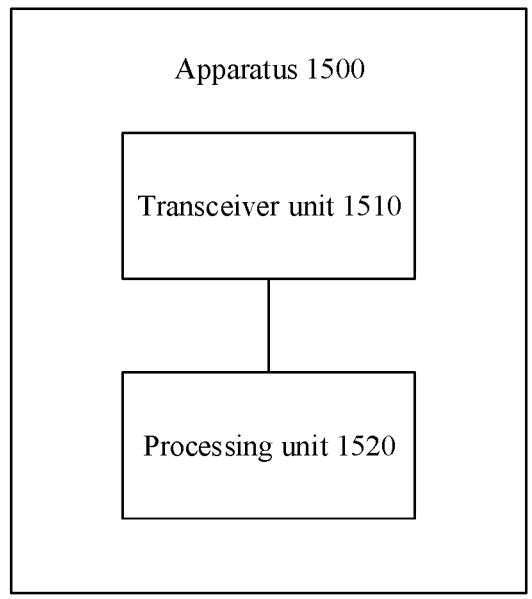
FIG. 19 is a schematic block diagram of an information transmission apparatus according to an embodiment of this application.

FIG. 19 is a schematic block diagram of an information transmission apparatus 1500 according to an embodiment of this application. As shown in FIG. 19, the information transmission apparatus 1500 may include a transceiver unit 1510 and a processing unit 1520.

In a possible design, the information transmission apparatus may be the first network device in the method 200 to the method 1400, or a chip disposed in the first network device.

Specifically, the transceiver unit 1510 is configured to send first information to a terminal device, where the first information is used to indicate the terminal device to be handed over from a first cell to a second cell, the first cell is a cell served by a second network device, the second cell is a cell served by a third network device, and the second network device and the third network device are different network devices.

The transceiver unit 1510 is further configured to receive second information sent by the terminal device, where the second information includes information about a radio link failure that occurs between the terminal device and the second cell, or the second information includes information about beam failure recovery that occurs between the terminal device and the second cell.

The second information further includes information about a resource, and the information about the resource includes any one or more of information about a beam, information about an uplink carrier, or information about a bandwidth part.

The processing unit 1520 is configured to perform mobility robustness optimization based on the second information.

Optionally, when the second information includes the information about the beam failure recovery that occurs between the terminal device and the second cell, the second information further includes any one or more of a quantity of beam failures, a quantity of beam failure recovery times, or beam failure recovery duration.

Optionally, the transceiver unit 1510 is specifically configured to:
send third information to the second network device, where the third information is used to indicate a mobility parameter problem; or
send fourth information to the third network device, where the fourth information is used to indicate a configuration problem of the resource.

Optionally, the transceiver unit 1510 is further configured to receive fifth information sent by the third network device, where the fifth information is used to indicate an adjusted configuration of the resource.

Optionally, the information about the beam includes an identifier of the beam and/or measurement information of the beam, and the identifier of the beam includes a synchronization signal block SSB group number and/or a channel state information reference signal CSI-RS group number; and the information about the uplink carrier includes an identifier of the uplink carrier and/or measurement information of the uplink carrier, the identifier of the uplink carrier includes frequency information of the uplink carrier, and the uplink carrier includes a normal uplink carrier and/or a supplementary uplink carrier.

Optionally, a protocol layer function of the second network device includes any one or more of a radio link control protocol layer function, a media access control layer function, and a physical layer function; and/or
a protocol layer function of the third network device includes any one or more of a radio link control protocol layer function, a media access control layer function, and a physical layer function.

It should be understood that the information transmission apparatus 1500 may correspond to the first network device in the foregoing method embodiments, and the information transmission apparatus 1500 may include units configured to perform the method performed by the first network device in the information transmission methods 200 to 1400. In addition, the units in the information transmission apparatus 1500 and the foregoing other operations and/or functions are separately intended to implement corresponding procedures of the information transmission methods 200 to 1400. For a specific process of performing the foregoing corresponding steps by the units, refer to the foregoing descriptions with reference to the method embodiments in FIG. 6 to FIG. 18. For brevity, details are not described herein again.

Figure 20:
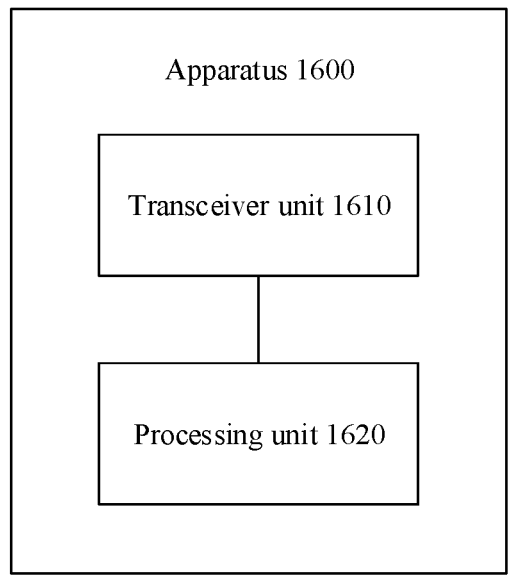
FIG. 20 is another schematic block diagram of an information transmission apparatus according to an embodiment of this application.

FIG. 20 is a schematic block diagram of an information transmission apparatus 1600 according to an embodiment of this application. As shown in FIG. 20, the information transmission apparatus 1600 may include a transceiver unit 1610 and a processing unit 1620.

In a possible design, the information transmission apparatus may be the third network device in the method 200 to the method 1400, or a chip disposed in the third network device.

Specifically, the transceiver unit 1610 is configured to receive second information from a terminal device, where the second information includes information about a radio link failure that occurs between the terminal device and a second cell, or the second information includes information about beam failure recovery that occurs between the terminal device and the second cell, and the second cell is a cell served by the third network device The second information further includes information about a resource, and the information about the resource includes any one or more of information about a beam, information about an uplink carrier, or information about a bandwidth part.

The processing unit 1620 is configured to: adjust a configuration of the resource based on the second information, or send, third information to a first network device, where the third information is used to indicate a mobility parameter problem.

Optionally, when the second information includes the information about the beam failure recovery that occurs between the terminal device and the second cell, the transceiver unit 1610 is specifically configured to:

receive, by using a signaling radio bearer SRB3, the second information sent by the terminal device.

Optionally, when the second information includes the information about the beam failure recovery that occurs between the terminal device and the second cell, the second information further includes any one or more of a quantity of beam failures, a quantity of beam failure recovery times, or beam failure recovery duration.

Optionally, when the second information includes the information about the radio link failure that occurs between the terminal device and the second cell, the transceiver unit 1610 is specifically configured to:

receive the second information sent by the first network device.

Optionally, the information about the beam includes an identifier of the beam and/or measurement information of the beam, and the identifier of the beam includes a synchronization signal block SSB group number and/or a channel state information reference signal CSI-RS group number; and the information about the uplink carrier includes an identifier of the uplink carrier and/or measurement information of the uplink carrier, the identifier of the uplink carrier includes frequency information of the uplink carrier, and the uplink carrier includes a normal uplink carrier and/or a supplementary uplink carrier.

Optionally, the processing unit 1620 is specifically configured to perform any one or more of the following operations:

adjusting a first threshold corresponding to the SSB;
adjusting a second threshold corresponding to the CSI-RS;
adjusting a third threshold corresponding to the supplementary uplink carrier; or
adjusting a random access channel RACH resource.

Optionally, a protocol layer function of the apparatus is any one or more of a radio link control protocol layer function, a media access control layer function, and a physical layer function; and/or a protocol layer function of the apparatus is any one or more of a radio link control protocol layer function, a media access control layer function, and a physical layer function.

It should be understood that the information transmission apparatus 1600 may correspond to the third network device in the foregoing method embodiments, and the information transmission apparatus 1600 may include units configured to perform the method performed by the third network device in the information transmission methods 200 to 1400. In addition, the units in the information transmission apparatus 1600 and the foregoing other operations and/or functions are separately intended to implement corresponding procedures of the information transmission methods 200 to 1400. For a specific process of performing the foregoing corresponding steps by the units, refer to the foregoing descriptions with reference to the method embodiments in FIG. 6 to FIG. 18. For brevity, details are not described herein again.

Figure 21:
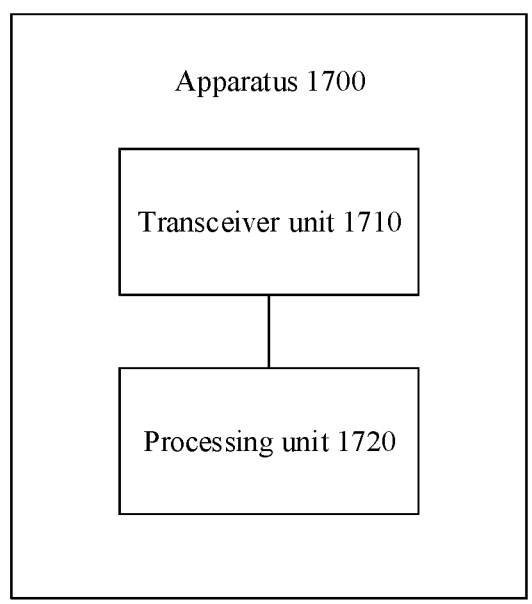
FIG. 21 is another schematic block diagram of an information transmission apparatus according to an embodiment of this application.

FIG. 21 is a schematic block diagram of an information transmission apparatus 1700 according to an embodiment of this application. As shown in FIG. 21, the information transmission apparatus 1700 may include a transceiver unit 1710 and a processing unit 1720.

In a possible design, the information transmission apparatus may be the terminal device in the method 200 to the method 1400, or a chip configured in the terminal device.

Specifically, the transceiver unit 1710 is configured to receive first information sent by a first network device, where the first information is used to indicate a terminal device to be handed over from a first cell to a second cell, the first cell is a cell served by a second network device, the second cell is a cell served by a third network device, and the second network device and the third network device are different network devices.

The processing unit 1720 is configured to generate second information, where the second information includes information about a radio link failure that occurs between the terminal device and the second cell, or the second information includes information about beam failure recovery that occurs between the terminal device and the second cell.

The second information further includes information about a resource, and the information about the resource includes any one or more of information about a beam, information about an uplink carrier, or information about a bandwidth part.

The transceiver unit 1710 is further configured to send the second information to the first network device.

Optionally, when the second information includes the information about the beam failure recovery that occurs between the terminal device and the second cell, the second information further includes any one or more of a quantity of beam failures, a quantity of beam failure recovery times, or beam failure recovery duration.

Optionally, the information about the beam includes an identifier of the beam and/or measurement information of the beam, and the identifier of the beam includes a synchronization signal block SSB group number and/or a channel state information reference signal CSI-RS group number; and the information about the uplink carrier includes an identifier of the uplink carrier and/or measurement information of the uplink carrier, the identifier of the uplink carrier includes frequency information of the uplink carrier, and the uplink carrier includes a normal uplink carrier and/or a supplementary uplink carrier.

It should be understood that the information transmission apparatus 1700 may correspond to the terminal device in the foregoing method embodiment, and the information transmission apparatus 1700 may include units configured to perform the method performed by the terminal device in the information transmission method 200 to the method 1400. In addition, the units in the information transmission apparatus 1700 and the foregoing other operations and/or functions are separately intended to implement corresponding procedures of the information transmission methods 200 to 1400. For a specific process of performing the foregoing corresponding steps by the units, refer to the foregoing descriptions with reference to the method embodiments in FIG. 6 to FIG. 18. For brevity, details are not described herein again.

Figure 22:
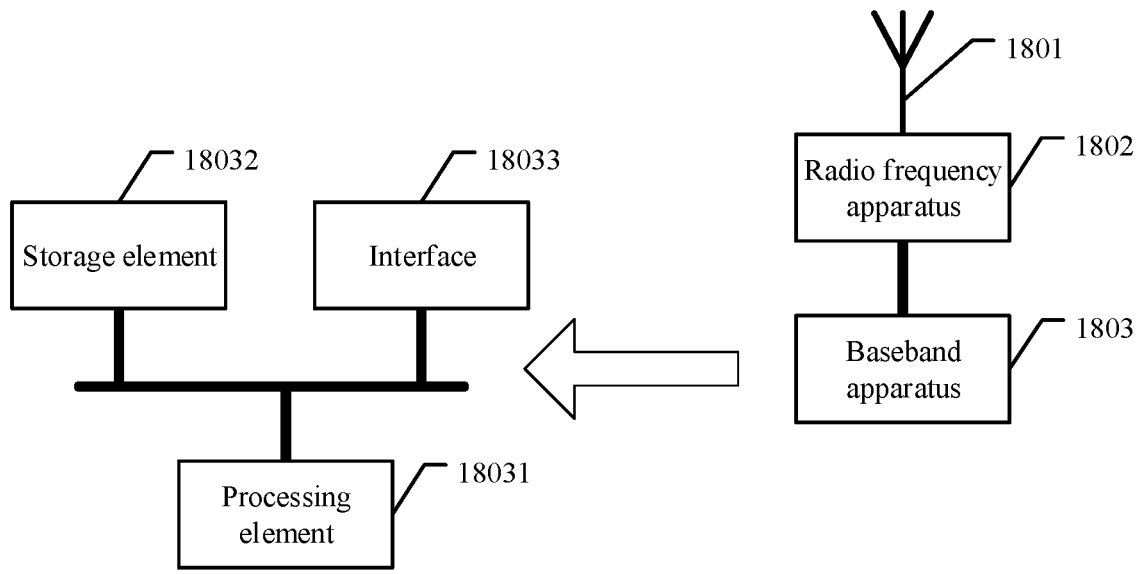
FIG. 22 is a schematic structural diagram of a network device according to an embodiment of this application.

FIG. 22 is a schematic structural diagram of a network device according to an embodiment of this application. The network device may be the network device (any one of the first network device to the third network device) in the foregoing embodiments, and is configured to implement operations of the network device (any one of the first network device to the third network device) in the foregoing embodiments. As shown in FIG. 22, the network device includes an antenna 1801, a radio frequency apparatus 1802, and a baseband apparatus 1803. The antenna 1801 is connected to the radio frequency apparatus 1802. In an uplink direction, the radio frequency apparatus 1802 receives, through the antenna 1801, information sent by a terminal device, and sends, to the baseband apparatus 1803 for processing, the information sent by the terminal device. In a downlink direction, the baseband apparatus 1803 processes information of the terminal device, and sends the information to the radio frequency apparatus 1802. The radio frequency apparatus 1802 processes the information of the terminal device, and then sends the processed information to the terminal device through the antenna 1801.

The baseband apparatus 1803 may include one or more processing elements 18031, for example, include a main control CPU and another integrated circuit. In addition, the baseband apparatus 1803 may further include a storage element 18032 and an interface 18033. The storage element 18032 is configured to store a program and data. The interface 18033 is configured to exchange information with the radio frequency apparatus 1802, and the interface is, for example, a common public radio interface (common public radio interface, CPRI). The foregoing apparatus used in the network device may be located in the baseband apparatus 1803. For example, the foregoing apparatus used in the network device may be a chip in the baseband apparatus 1803. The chip includes at least one processing element and an interface circuit. The processing element is configured to perform the steps of any method performed by the network device. The interface circuit is configured to communicate with another apparatus. In an implementation, units of the network device that implement the steps in the foregoing methods may be implemented by a processing element scheduling a program. For example, the apparatus used for the network device includes a processing element and a storage element. The processing element invokes a program stored in the storage element, to perform the methods performed by the network device in the foregoing method embodiments. The storage element may be a storage element located on a same chip as the processing element, in other words, may be an on-chip storage element, or may be a storage element located on a different chip from the processing element, in other words, may be an off-chip storage element.

In another implementation, units used by the network device to implement the steps in the foregoing methods may be configured as one or more processing elements. These processing elements are disposed on the baseband apparatus.

The processing element herein may be an integrated circuit, for example, one or more application-specific integrated circuits (application-specific integrated circuit, ASIC), one or more digital signal processors (digital signal processor, DSP), one or more programmable gate arrays (field programmable gate array, FPGA), or a combination of these integrated circuits. The integrated circuits may be integrated together to form a chip.

Units of the network device that implement the steps in the foregoing methods may be integrated together, and implemented in a form of an SOC. For example, the baseband apparatus includes the SOC chip, configured to implement the foregoing methods. At least one processing element and storage element may be integrated into the chip, and the processing element invokes a program stored in the storage element to implement the foregoing methods performed by the network device. Alternatively, at least one integrated circuit may be integrated into the chip, to implement the foregoing methods performed by the network device. Alternatively, with reference to the foregoing implementations, functions of some units may be implemented by a program invoked by the processing element, and functions of some units may be implemented by the integrated circuit.

It can be learned that the foregoing apparatus used for the network device may include at least one processing element and interface circuit. The at least one processing element is configured to perform any one of the methods that are provided in the foregoing method embodiments and performed by the network device. The processing element may perform some or all steps performed by the network device, in a first manner, to be specific, by invoking the program stored in the storage element; or may perform some or all steps performed by the network device, in a second manner, to be specific, by using a hardware integrated logic circuit in the processor element in combination with instructions; or may certainly perform, by combining the first manner and the second manner, some or all steps performed by the network device.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of these forms of integrated circuits.

A storage element may be one memory, or may be a general term of a plurality of storage elements.

Figure 23:
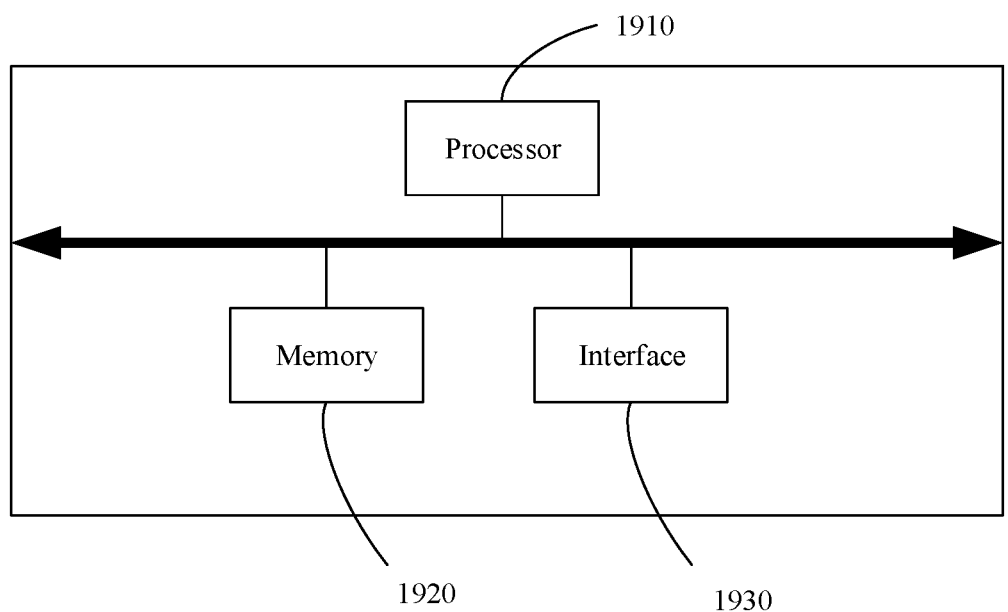
FIG. 23 is another schematic structural diagram of a network device according to an embodiment of this application.

FIG. 23 is another schematic structural diagram of a network device according to an embodiment of this application. The network device may be the network device in the foregoing embodiments, and is configured to implement an operation of the network device in the foregoing embodiments.

As shown in FIG. 23, the network device includes a processor 1910, a memory 1920, and an interface 1930. The processor 1910, the memory 1920, and the interface 1930 are signal-connected.

The foregoing information transmission apparatus 1500 or 1600 may be located in the network device, and a function of each unit may be implemented by the processor 1910 by invoking a program stored in the memory 1920. That is, the foregoing information transmission apparatus 1500 or 1600 includes a memory and a processor. The memory is configured to store a program, and the program is invoked by the processor to perform the methods in the foregoing method embodiments. The processor herein may be an integrated circuit having a signal processing capability, for example, a CPU. Alternatively, functions of the foregoing units may be implemented by one or more integrated circuits configured to implement the foregoing methods, for example, one or more ASICs, one or more microprocessors DSPs, one or more FPGAs, or a combination of at least two of the integrated circuits. Alternatively, the foregoing implementations may be combined.

Figure 24:
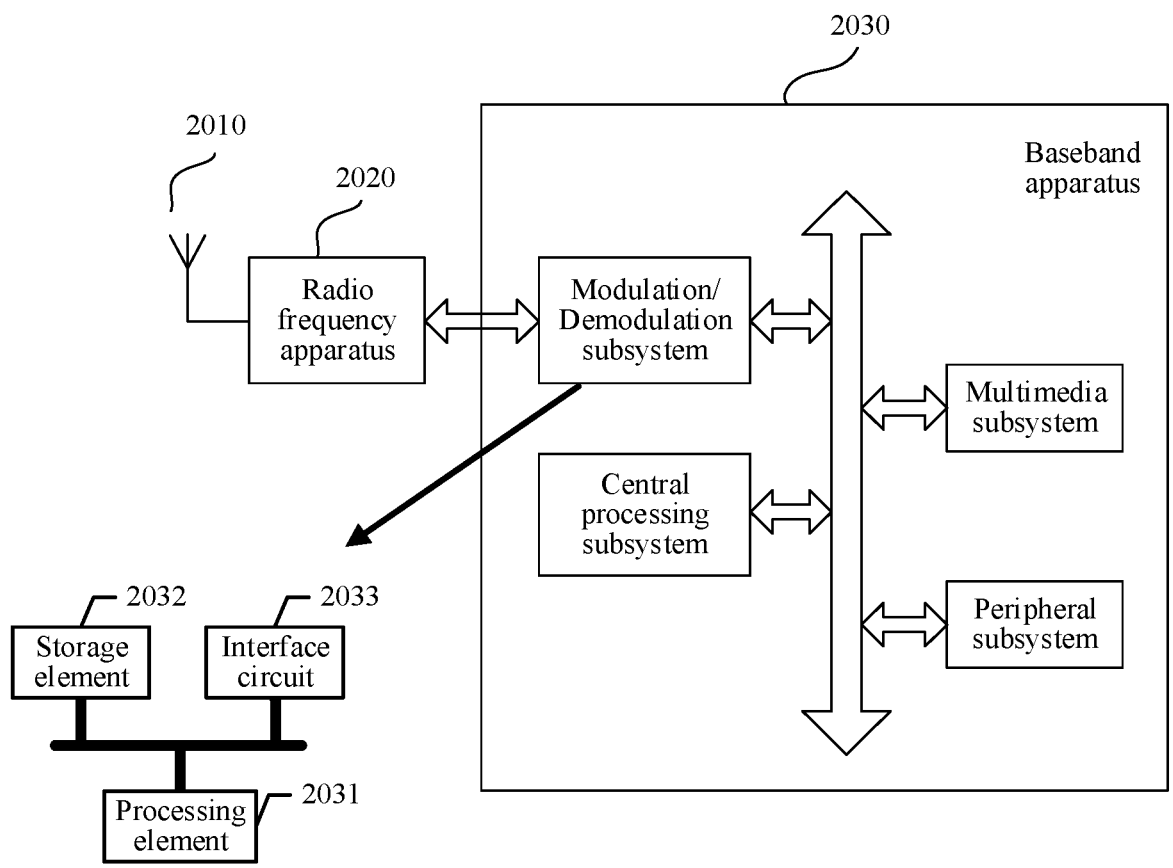
FIG. 24 is a schematic structural diagram of a terminal device according to an embodiment of this application.

FIG. 24 is a schematic structural diagram of a terminal device according to an embodiment of this application. The terminal device may be the terminal device in the foregoing embodiments, and is configured to implement an operation of the terminal device in the foregoing embodiments. As shown in FIG. 24, the terminal device includes an antenna 2010, a radio frequency part 2020, and a signal processing part 2030. The antenna 2010 is connected to the radio frequency part 2020. In a downlink direction, the radio frequency part 2020 receives, through the antenna 2010, information sent by a network device, and sends, to the signal processing part 2030 for processing, the information sent by the network device. In an uplink direction, the signal processing part 2030 processes information of the terminal device, and sends the information to the radio frequency part 2020. The radio frequency part 2020 processes the information of the terminal device, and then sends the processed information to the network device through the antenna 2010.

The signal processing part 2030 may include a modem subsystem, configured to process data at each communications protocol layer. The signal processing part may further include a central processing subsystem, configured to implement processing of an operating system and an application layer of the terminal device. In addition, the signal processing part may further include another subsystem, for example, a multimedia subsystem or a peripheral subsystem. The multimedia subsystem is configured to control a camera or a screen display of the terminal device, and the peripheral subsystem is configured to implement a connection to another device. The modem subsystem may be a separately disposed chip. Optionally, the foregoing apparatus used for the terminal device may be located in the modem subsystem.

The modem subsystem may include one or more processing elements 2031, for example, include a main control CPU and another integrated circuit. In addition, the modem subsystem may further include a storage element 2032 and an interface circuit 2033. The storage element 2032 is configured to store data and a program. However, a program used to perform the methods performed by the terminal device in the foregoing methods may not be stored in the storage element 2032, but is stored in a memory outside the modem subsystem, and is loaded and used by the modem subsystem when to be used. The interface circuit 2033 is configured to communicate with another subsystem. The foregoing apparatus used for the terminal device may be located in the modem subsystem, and the modem subsystem may be implemented by using a chip. The chip includes at least one processing element and at least one interface circuit. The processing element is configured to perform the steps in any one of the methods performed by the terminal device. The interface circuit is configured to communicate with another apparatus. In an implementation, units of the terminal device that implement the steps in the foregoing methods may be implemented by a program scheduled by a processing element. For example, the apparatus used for the terminal device includes a processing element and a storage element. The processing element invokes a program stored in the storage element, to perform the methods performed by the terminal device in the foregoing method embodiments.

The storage element may be a storage element located on a same chip as the processing element, in other words, may be an on-chip storage element.

In another implementation, the program used to perform the methods performed by the terminal device in the foregoing methods may be in a storage element located on a different chip from the processing element, namely, an off-chip storage element. In this case, the processing element invokes or loads the program from the off-chip storage element to the on-chip storage element, to invoke and perform the methods performed by the terminal device in the foregoing method embodiments.

In still another implementation, units of the terminal device that implement the steps in the foregoing methods may be configured as one or more processing elements. These processing elements are disposed in the modem subsystem. The processing element herein may be an integrated circuit, for example, one or more ASICs, one or more DSPs, one or more FPGAs, or a combination of these types of integrated circuits. The integrated circuits may be integrated together to form a chip.

Units of the terminal device that implement the steps in the foregoing methods may be integrated together, and implemented in a form of an SOC. The SOC chip is configured to implement the foregoing methods. At least one processing element and storage element may be integrated into the chip, and the processing element invokes a program stored in the storage element to implement the foregoing methods performed by the terminal device. Alternatively, at least one integrated circuit may be integrated into the chip, to implement the foregoing methods performed by the terminal device. Alternatively, with reference to the foregoing implementations, functions of some units may be implemented by the processing element invoking a program, and functions of some units may be implemented by the integrated circuit.

It can be learned that the foregoing apparatus used for the terminal device may include at least one processing element and interface circuit. The at least one processing element is configured to perform any one of the methods performed by the terminal device that are provided in the foregoing method embodiments. The processing element may perform some or all steps performed by the terminal device, in a first manner, to be specific, by invoking the program stored in the storage element; or may perform some or all steps performed by the terminal device, in a second manner, to be specific, by using a hardware integrated logic circuit in the processor element in combination with an instruction; or may certainly perform, by combining the first manner and the second manner, some or all steps performed by the terminal device.

According to the methods provided in the embodiments of this application, this application further provides a computer program product. The computer program product includes computer program code. When the computer program code is run on a computer, the computer is enabled to perform the methods in the foregoing embodiments.

According to the methods provided in the embodiments of this application, this application further provides a computer-readable medium. The computer-readable medium stores program code. When the program code is run on a computer, the computer is enabled to perform the methods in the foregoing embodiments.

The terminal device and the network device in the foregoing apparatus embodiments may exactly correspond to the terminal device or the network device in the method embodiments, and a corresponding module or unit performs a corresponding step. For example, when the apparatus is implemented in a form of a chip, the receiving unit may be an interface circuit that is of the chip and that is configured to receive a signal from another chip or apparatus. The foregoing unit used for sending is an interface circuit of the apparatus, and is configured to send a signal to another apparatus. For example, when the apparatus is implemented in a form of a chip, the sending unit is an interface circuit that is of the chip and that is configured to send a signal to another chip or apparatus.

An embodiment of this application further provides a communications system. The communications system includes the foregoing terminal device and/or the foregoing network device.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in other manners. For example, the described apparatus embodiments are merely examples. For example, division into the units is merely logical function division. There may be another division manner during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one location, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An information transmission method, comprising:
   sending, by a first network device, first information to a terminal device, wherein the first information is used to indicate the terminal device to be handed over from a first cell to a second cell, wherein the first cell is a cell served by a second network device, wherein the second cell is a cell served by a third network device, and wherein the second network device and the third network device are different network devices;
   in response to sending the first information to the terminal device, receiving, by the first network device, second information sent by the terminal device, wherein the second information comprises information about beam failure recovery that occurs between the terminal device and the second cell and information about a resource, and wherein the information about the resource comprises any one or more of an identifier of a beam used when the terminal device encounters the beam failure recovery, random access information of the terminal device on the beam, a physical cell identifier, or cell frequency information; and
   performing, by the first network device, mobility robustness optimization based on the second information, wherein the second information comprises a time period from a time at which the terminal device performs cell change to a time at which a radio link failure occurs.

2. The method according to claim 1, wherein the second information further comprises any one or more of a quantity of beam failures, a quantity of beam failure recovery times, and beam failure recovery duration.

3. The method according to claim 1, wherein performing, by the first network device, the mobility robustness optimization based on the second information comprises:
   sending, by the first network device, third information to the second network device, wherein the third information is used to indicate a mobility parameter problem, and the third information comprises identification information of the terminal device in a cell served by a source secondary station.

4. The method according to claim 1, wherein the method further comprises:
   sending, by the first network device, the second information to the second network device.

5. The method according to claim 1, wherein the identifier of the beam comprises at least one of a group number of a synchronization signal block (SSB) or a group number of a channel state information reference signal (CSI-RS).

6. The method according to claim 1, wherein the first network device is a primary network device, and the second network device and the third network device are secondary network devices.

7. The method according to claim 1, wherein before sending the first information to the terminal device, the method further comprises:
receiving, by the first network device, change indication information sent by the second network device, wherein the change indication information indicates the first network device to hand over the terminal device from the first cell to the second cell.

8. The method according to claim 1, wherein the second information further comprises measurement information of a cell in which the beam is located and measurement information of a cell in which an adjacent beam is located.

9. The method according to claim 1, wherein the random access information comprises any one or more of a quantity of preamble attempts, preamble information used in a preamble attempt, contention indication information, load information of a random access channel, load information of a physical uplink shared channel, maximum power arrival indication information, failure duration information, access delay information, path loss estimation information, backoff time information, information about data available for transmission, and a random access type.

10. The method according to claim 1, wherein performing, by the first network device, the mobility robustness optimization based on the second information comprises:
determining, by the first network device, a cause for a radio link failure that occurs between the terminal device and the second cell based on the second information.

11. An information transmission method, comprising:
receiving, by a terminal device, first information sent by a first network device, wherein the first information is used to indicate the terminal device to be handed over from a first cell to a second cell, wherein the first cell is a cell served by a second network device, wherein the second cell is a cell served by a third network device, and wherein the second network device and the third network device are different network devices; and
in response to receiving the first information sent by the first network device, sending, by the terminal device, second information to the first network device, wherein the second information comprises information about beam failure recovery that occurs between the terminal device and the second cell and information about a resource, the information about the resource comprises any one or more of an identifier of a beam, random access information of the terminal device on the beam, a physical cell identifier, or cell frequency information, and the second information comprises a time period from a time at which the terminal device performs cell change to a time at which a radio link failure occurs.

12. The method according to claim 11, wherein the second information further comprises any one or more of a quantity of beam failures, a quantity of beam failure recovery times, and beam failure recovery duration.

13. The method according to claim 11, wherein the identifier of the beam comprises at least one of a group number of a synchronization signal block (SSB) or a group number of a channel state information reference signal (CSI-RS).

14. The method according to claim 11, wherein the second information further comprises measurement information of a cell in which the beam is located and measurement information of a cell in which an adjacent beam is located.

15. The method according to claim 11, wherein the random access information comprises any one or more of a quantity of preamble attempts, preamble information used in a preamble attempt, contention indication information, load information of a random access channel, load information of a physical uplink shared channel, maximum power arrival indication information, failure duration information, access delay information, path loss estimation information, backoff time information, information about data available for transmission, and a random access type.

16. An apparatus, applied for a first network device, comprising:
at least one processor; and
one or more memories coupled to the at least one processor and storing programming instructions which, when executed by the at least one processor, cause the apparatus to perform operations comprising:
sending first information to a terminal device, wherein the first information is used to indicate the terminal device to be handed over from a first cell to a second cell, wherein the first cell is a cell served by a second network device, wherein the second cell is a cell served by a third network device, and wherein the second network device and the third network device are different network devices;
in response to sending the first information to the terminal device, receiving second information sent by the terminal device, wherein the second information comprises information about beam failure recovery that occurs between the terminal device and the second cell and information about a resource, and wherein the information about the resource comprises any one or more of an identifier of a beam used when the terminal device encounters the beam failure recovery, random access information of the terminal device on the beam, a physical cell identifier, or cell frequency information; and
performing mobility robustness optimization based on the second information, wherein the second information comprises a time period from a time at which the terminal device performs cell change to a time at which a radio link failure occurs.

17. The apparatus according to claim 16, wherein the second information further comprises any one or more of a quantity of beam failures, a quantity of beam failure recovery times, and beam failure recovery duration.

18. The apparatus according to claim 16, wherein performing the mobility robustness optimization based on the second information comprises:
sending third information to the second network device, wherein the third information is used to indicate a mobility parameter problem, and the third information comprises identification information of the terminal device in a cell served by a source secondary station.

19. The apparatus according to claim 18, wherein the operations further comprise:
sending the second information to the second network device.

20. The apparatus according to claim 16, wherein the identifier of the beam comprises at least one of a group number of a synchronization signal block (SSB) or a group number of a channel state information reference signal (CSI-RS).

21. An apparatus, applied for a terminal device, comprising:
at least one processor; and
one or more memories coupled to the at least one processor and storing programming instructions which, when executed by the at least one processor, cause the apparatus to perform operations comprising:

receiving first information sent by a first network device, wherein the first information is used to indicate the apparatus to be handed over from a first cell to a second cell, wherein the first cell is a cell served by a second network device, wherein the second cell is a cell served by a third network device, and wherein the second network device and the third network device are different network devices; and in response to receiving the first information sent by the first network device, sending second information to the first network device, wherein the second information comprises information about beam failure recovery that occurs between the apparatus and the second cell and information about a resource, the information about the resource comprises any one or more of an identifier of a beam, random access information of the terminal device on the beam, a physical cell identifier, or cell frequency information, and the second information comprises a time period from a time at which the terminal device performs cell change to a time at which a radio link failure occurs.

22. The apparatus according to claim 21, wherein the second information further comprises any one or more of a quantity of beam failures, a quantity of beam failure recovery times, and beam failure recovery duration.

23. The apparatus according to claim 21, wherein the identifier of the beam comprises at least one of a group number of a synchronization signal block (SSB) or a group number of a channel state information reference signal (CSI-RS).

* * * * *